(12) United States Patent
Lei et al.

(10) Patent No.: US 9,082,034 B2
(45) Date of Patent: Jul. 14, 2015

(54) BARCODE READER HAVING MULTIPLE ILLUMINATION SYSTEMS AND MULTIPLE SETS OF IMAGING OPTICS

(71) Applicant: The Code Corporation, Draper, UT (US)

(72) Inventors: Ming Lei, Princeton Junction, NJ (US); George Powell, Draper, UT (US)

(73) Assignee: The Code Corporation, Draper, UT (US)

( * ) Notice: Subject to any disclaimer, the term of this patent is extended or adjusted under 35 U.S.C. 154(b) by 0 days.

(21) Appl. No.: 14/105,390

(22) Filed: Dec. 13, 2013

(65) Prior Publication Data

US 2015/0021400 A1    Jan. 22, 2015

Related U.S. Application Data

(63) Continuation-in-part of application No. 13/946,862, filed on Jul. 19, 2013, now Pat. No. 8,820,643, and a continuation-in-part of application No. 14/062,743, filed on Oct. 24, 2013, now Pat. No. 8,857,720.

(51) Int. Cl.
  *G06K 7/10*    (2006.01)
  *G06K 7/14*    (2006.01)

(52) U.S. Cl.
  CPC .......... *G06K 7/1404* (2013.01); *G06K 7/10732* (2013.01); *G06K 7/1465* (2013.01); *G06K 2007/10485* (2013.01)

(58) Field of Classification Search
  CPC .......... G06K 7/10574; G06K 7/10594; G06K 7/10673; G06K 7/10712; G06K 7/10732; G06K 7/10742
  USPC ........... 235/454, 462.14, 462.42, 462.43, 459
  See application file for complete search history.

(56) References Cited

U.S. PATENT DOCUMENTS

| | | | |
|---|---|---|---|
| 6,942,152 B1 | 9/2005 | Hepworth | |
| 7,014,113 B1 | 3/2006 | Powell et al. | |
| 7,036,735 B2 | 5/2006 | Hepworth et al. | |
| 7,533,819 B2 * | 5/2009 | Barkan et al. | 235/462.09 |
| 7,757,955 B2 * | 7/2010 | Barkan | 235/462.01 |
| 8,033,472 B2 * | 10/2011 | Giebel et al. | 235/462.42 |
| 8,240,569 B2 | 8/2012 | Hyde et al. | |
| 8,450,708 B2 * | 5/2013 | Liu et al. | 250/566 |

* cited by examiner

*Primary Examiner* — Seung Lee
(74) *Attorney, Agent, or Firm* — Timothy P. O'Hagan; Austin Rapp & Hardman

(57) ABSTRACT

A barcode reader comprises a first lens assembly with a first field of view and a first optical path for first illumination from the first field of view to project to a first image sensor section. The barcode reader further comprises a second lens assembly with a second field of view and a second optical path for second illumination from the second field of view to project to a second image sensor section. The barcode reader further comprises a first illumination system positioned outside of the first field of view projecting the first illumination into the first field of view at a first angle from the first optical path. The barcode reader further comprises a second illumination system positioned between the second lens assembly and a point from which the first illumination system projects the first illumination into the first field of view.

32 Claims, 23 Drawing Sheets

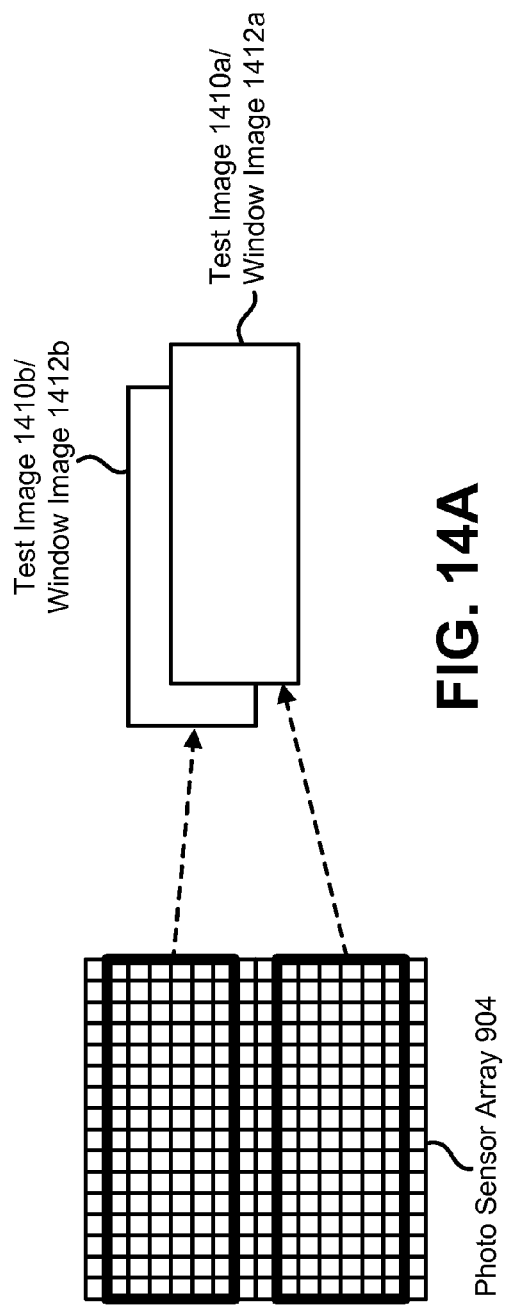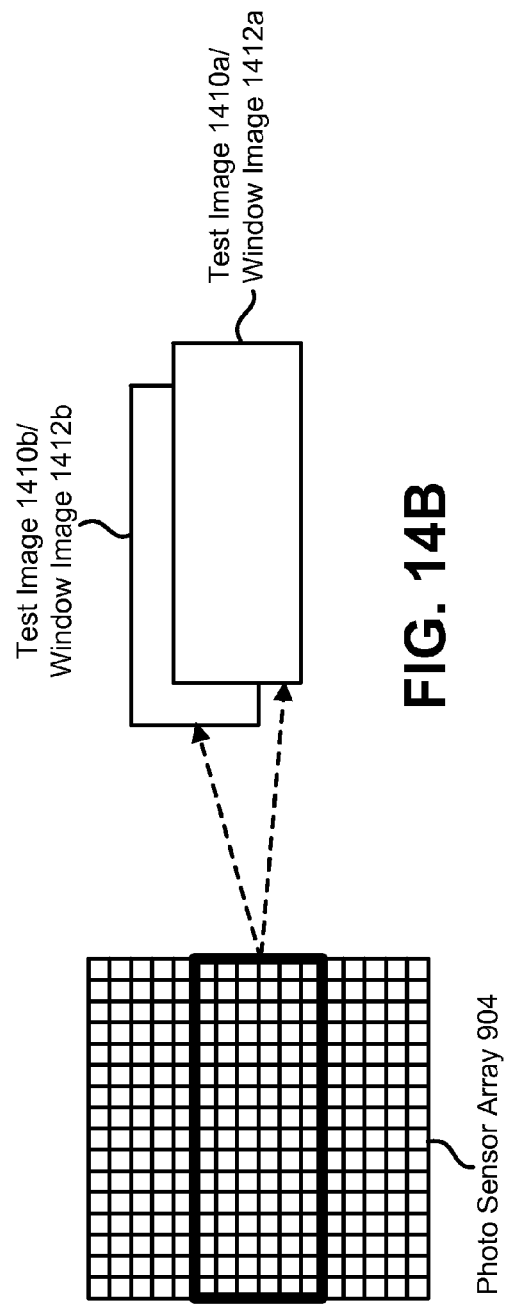

BARCODE READER HAVING MULTIPLE ILLUMINATION SYSTEMS AND MULTIPLE SETS OF IMAGING OPTICS

CLAIM OF PRIORITY

This application is a continuation-in-part of U.S. patent application Ser. No. 13/946,862, titled "Selecting Illumination Characteristics That Will Be Most Suitable For Reading A Barcode," filed Jul. 19, 2013, with inventors Ming Lei and Ryan Hoobler.

This application is also a continuation-in-part of U.S. patent application Ser. No. 14/062,743, titled "Diffuse Bright Field Illumination System For A Barcode Reader," filed Oct. 24, 2013, with inventors Ming Lei and George Powell.

TECHNICAL FIELD

The present disclosure relates generally to barcode readers. More specifically, the present disclosure relates to a barcode reader that includes multiple illumination systems and multiple sets of imaging optics.

BACKGROUND

A barcode is an optical machine-readable representation of information. Devices for identifying or extracting information from barcodes are generally referred to as barcode readers (or barcode scanners). An image-based barcode reader includes a camera for capturing an image of a barcode to be read. The camera includes a focusing lens that focuses light reflected from a target area onto a photo sensor array. Once an image of a barcode has been captured by the camera, a decoder processes the image and extracts the information contained in the barcode.

SUMMARY

According to one aspect of the invention, there is provided a barcode reader comprising a first lens assembly with a first field of view and a first optical path for first illumination from the first field of view to project to a first image sensor section. The barcode reader further comprises a second lens assembly with a second field of view and a second optical path for second illumination from the second field of view to project to a second image sensor section. The barcode reader further comprises a first illumination system positioned outside of the first field of view projecting the first illumination into the first field of view at a first angle from the first optical path. The barcode reader further comprises a second illumination system positioned between the second lens assembly and a point from which the first illumination system projects the first illumination into the first field of view. The second illumination system is outside of the second field of view. The second illumination system projects the second illumination into the second field of view at a second angle from the second optical path. The second angle is different than the first angle.

Alternatively or additionally, the first optical path and the second optical path are substantially parallel.

Alternatively or additionally, the first angle is less than 45 degrees from a plane that is perpendicular to the first optical path.

Alternatively or additionally, the second angle is substantially parallel to the second optical path.

Alternatively or additionally, the first illumination system comprises a first set of illumination sources that are positioned to a left side of the first and second lens assemblies and a second set of illumination sources that are positioned to a right side of the first and second lens assemblies.

Alternatively or additionally, the barcode reader further comprises control circuitry that independently controls intensity of the first set of illumination sources and the second set of illumination sources.

Alternatively or additionally, the first illumination system comprises a back lit illumination diffusor projecting the first illumination into the first field of view at the first angle, the first angle being less than 45 degrees from a plane that is perpendicular to the first optical path.

Alternatively or additionally, the first illumination system comprises a refracting diffusor through which illumination enters at an entry angle that is different than the first angle and exits towards the first field of view at the first angle, the first angle being less than 45 degrees from a plane that is perpendicular to the first optical path.

Alternatively or additionally, the entry angle is substantially parallel to the first optical path.

Alternatively or additionally, the entry angle is substantially perpendicular to the first angle.

Alternatively or additionally, the second illumination system is a diffuse bright field illumination system comprising an optical substrate with a front major surface and a back major surface, each of which is substantially perpendicular to the first and second optical paths. The front major surface faces the first and second fields of view. The diffuse bright field illumination system further comprises at least one illumination source propagating illumination between the front major surface and the back major surface. The diffuse bright field illumination system further comprises extraction features causing the second illumination to exit the front major surface into the second field of view.

Alternatively or additionally, the second illumination system is a direct bright field illumination system comprising two refracting diffusors, through each of which illumination enters at an entry angle that is substantially parallel to the second optical path and exits towards the second field of view at a converging angle.

According to another aspect of the invention, there is provided a barcode reader comprising an image sensor configured to capture an image of a barcode within a field of view of the barcode reader. The barcode reader comprises a first set of imaging optics and a second set of imaging optics, each providing a corresponding image of the barcode on the image sensor. The first set of imaging optics comprises a first lens assembly with a first optical path from the field of view through the first lens assembly to a first portion of the image sensor. The second set of imaging optics comprises a second lens assembly with a second optical path from the field of view through the second lens assembly to a second portion of the image sensor. The barcode reader further comprises a first illumination system positioned outside of the field of view projecting first illumination into the field of view at a first angle from the first optical path. The barcode reader further comprises a second illumination system positioned between the second lens assembly and a point from which the first illumination system projects the first illumination into the field of view. The second illumination system is outside of the field of view and projects second illumination into the field of view at a second angle from the second optical path. The second angle is different than the first angle.

Alternatively or additionally, the first optical path and the second optical path are substantially parallel.

Alternatively or additionally, the first angle is less than 45 degrees from a plane that is perpendicular to the first optical path.

Alternatively or additionally, the second angle is substantially parallel to the second optical path.

Alternatively or additionally, the first illumination system comprises a first set of illumination sources that are positioned to a left side of the field of view and a second set of illumination sources that are positioned to a right side of the field of view.

Alternatively or additionally, the barcode reader further comprises control circuitry that independently controls intensity of the first set of illumination sources and the second set of illumination sources.

Alternatively or additionally, the first illumination system comprises a back lit illumination diffusor projecting illumination into the field of view at the first angle, the first angle being less than 45 degrees from a plane that is perpendicular to the first optical path.

Alternatively or additionally, the first illumination system comprises a refracting diffusor through which illumination enters at an entry angle that is different than the first angle and exits towards the field of view at the first angle, the first angle being less than 45 degrees from a plane that is perpendicular to the first optical path.

Alternatively or additionally, the entry angle is substantially parallel to the first optical path.

Alternatively or additionally, the entry angle is substantially perpendicular to the first angle.

Alternatively or additionally, the second illumination system is a diffuse bright field illumination system comprising an optical substrate with a front major surface and a back major surface, each of which is substantially perpendicular to an optical path of the barcode reader. The front major surface faces the field of view. The diffuse bright field illumination system further comprises at least one illumination source propagating illumination between the front major surface and the back major surface. The diffuse bright field illumination system further comprises extraction features causing the second illumination to exit the front major surface into the field of view.

Alternatively or additionally, the second illumination system is a direct bright field illumination system comprising two refracting diffusors, through each of which illumination enters at an entry angle substantially parallel to the second optical path and exits towards the field of view at a converging angle.

According to another aspect of the invention, there is provided a barcode reader comprising an image sensor configured to capture an image of a barcode within a field of view of the barcode reader. The barcode reader comprises a first illumination system positioned outside of the field of view projecting first illumination into the field of view at a first angle from the first optical path. The barcode reader further comprises a second illumination system positioned between the second lens assembly and a point from which the first illumination system projects the first illumination into the field of view. The second illumination system is outside of the field of view and projects second illumination into the field of view at a second angle from the second optical path. The second angle is different than the first angle. The barcode reader further comprises a first set of imaging optics and a second set of imaging optics, each providing a corresponding image of the barcode on the image sensor. The first set of imaging optics is configured to focus an image of the barcode, when illuminated by the first illumination system, with a superior contrast profile than when illuminated by the second illumination system. The second set of imaging optics is configured to focus an image of the barcode, when illuminated by the second illumination system, with a superior contrast profile than when illuminated by the first illumination system.

Alternatively or additionally, the first illumination system is a dark field illumination system. The dark field illumination system emits the illumination of the first illumination spectrum into the field of view at an emission angle that is less than 45 degrees from a plane that is perpendicular to an optical path from the image sensor through the first set of imaging optics into a center of the field of view of the first set of imaging optics.

Alternatively or additionally, the dark field illumination system comprises a first set of illumination sources positioned to a right side of the first and second lens assemblies and a second set of illumination sources positioned to a left side of the first and second lens assemblies.

Alternatively or additionally, the barcode reader further comprises control circuitry that independently controls intensity of the first set of illumination sources and the second set of illumination sources.

Alternatively or additionally, the dark field illumination system comprises a back lit illumination diffusor emitting the first illumination towards the first optical path at the emission angle.

Alternatively or additionally, the dark field illumination system comprises a refracting diffusor through which the first illumination is emitted towards the first optical path at the emission angle, and illumination enters the refracting diffusor at an entry angle that is different than the emission angle.

Alternatively or additionally, the entry angle is substantially parallel to the first optical path.

Alternatively or additionally, the entry angle is substantially perpendicular to the emission angle.

Alternatively or additionally, the second illumination system is a diffuse bright field illumination system comprising an optical substrate with a front major surface and a back major surface, each of which is substantially perpendicular to an optical path of the barcode reader. The front major surface faces a field of view of the first and second lens assemblies. The diffuse bright field illumination system further comprises at least one illumination source propagating illumination between the front major surface and the back major surface. The diffuse bright field illumination system further comprises extraction features causing the second illumination to exit the front major surface into the fields of view of the first and second lens assemblies.

A number of features are described herein with respect to embodiments of the invention; it will be appreciated that features described with respect to a given embodiment also may be employed in connection with other embodiments.

The invention includes the features described herein, including the description, the annexed drawings, and, if appended, the claims, which set forth in detail certain illustrative embodiments. These embodiments are indicative, however, of but a few of the various ways in which the principles of the invention may be employed.

BRIEF DESCRIPTION OF THE DRAWINGS

FIGS. 14A and 14B illustrate a plurality of test images comprising a plurality of window images.

DETAILED DESCRIPTION

The present invention provides a barcode reader for imaging a barcode using diffuse light. The barcode reader illuminates a barcode using an illumination system including an optical substrate. Light introduced into the optical substrate by at least one light source propagates between a front major surface and a back major surface in a direction transverse to an optical axis of a camera. Light is mixed by total internal reflection as its travels within the optical substrate and one or more extraction features included in the optical substrate allow light to be removed from the optical substrate in a directed intensity pattern. By allowing the light to mix as it propagates within the optical substrates, the propagating light loses any structure imparted onto it by the one or more light sources. By illuminating the barcode with unstructured light, it is possible to more accurately and quickly read the information contained in the imaged barcode.

Figure 1:
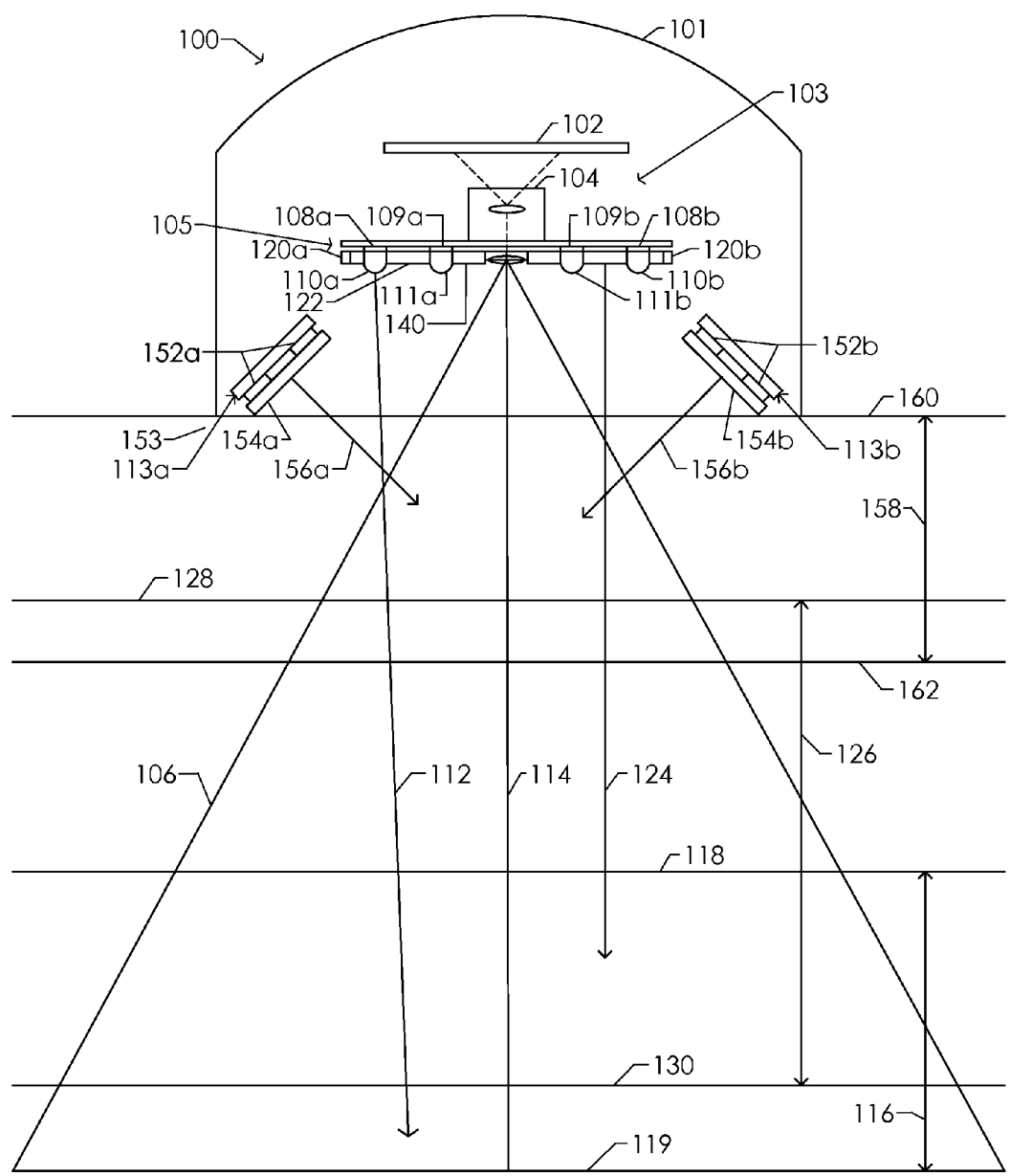
FIG. 1 is a top-down view of a barcode reader in accordance with the present disclosure.

FIG. 1 is a top-down view of a barcode reader 100 in accordance with the present disclosure. The barcode reader 100 includes a housing 101, a camera 103, and an illumination system 105. The barcode reader 100 illuminates a barcode with the illumination system 105 and captures an image of the barcode using the camera 103.

The camera 103 is located within the housing 101 and is configured to capture an image of a barcode within a field of view 106 of the camera 103. The field of view 106 of the camera 103 is directed along an optical axis 114 of the camera 103. The camera may include a photo sensor array 102 and a lens 104 that focuses illumination reflected from objects (e.g., a barcode) within the field of view 106 onto the photo sensor array 102. The optical axis of the camera 103 may be the optical axis of the lens 104. The camera 103 may be located near a center of the optical substrate 122 in one or more of the vertical dimension and the horizontal dimension.

As will be understood by one of ordinary skill in the art, the camera 103 may comprise any device capable of capturing an image of a field of view. For example, the photo sensor array 102 may comprise any detector capable of measuring or quantifying light incident on the pixel array of the detector. The detector may comprise, for example, an image sensor, CCD sensor, CMOS sensor, or any device capable of measuring or quantifying light incident on the pixel array of the detector. Similarly, the lens may comprise a single lens or series of lenses capable of focusing light onto the photo sensor array 102. Further details regarding specific embodiments of the camera 103 are discussed below.

The illumination system 105 is configured to illuminate the barcode while the camera 103 captures an image of the barcode. The illumination system 105 includes at least one light source 120 and an optical substrate 122 including one or more extraction features. The optical substrate 122 has a front major surface 140 and a back major surface 138 arranged generally perpendicular to the optical axis 114. Light is introduced from the at least one light source 120 between the front major surface 140 and the back major surface 138 (FIGS. 3A-3F and 4A-4C). The introduced light is transferred by total internal reflection through the optical substrate 122 between the front major surface 140 and back major surface 138 in a direction transverse to the optical axis 114. For example, in FIG. 1, light propagates through the optical substrate 122 in a directional generally perpendicular to the optical axis 114. In an alternative embodiment depicted in the cross sectional views of the optical substrate 122 of FIGS. 3B and 3C, the at least one light source 120 introduces light into the optical substrate 122 through the back major surface 138. In this example, the optical substrate 122 has a chamfered surface 125 that reflects light 191 through total internal reflection towards the optical axis 114.

Figure 2A:
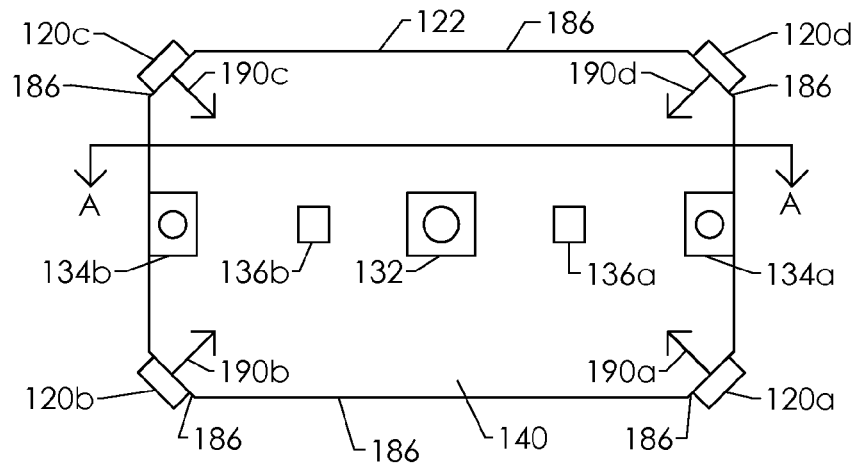
FIGS. 2A-2E are front views of different embodiments of an optical substrate within the barcode reader shown in FIG. 1.

As shown in FIG. 1, the front view of the optical substrate 122 shown in FIG. 2A, and the cross sectional views of the optical substrate 122 shown in 3A, and 3D to 3H the at least one light source 120 may be positioned adjacent an edge 186 of the optical substrate 122. In this configuration, as shown in FIG. 2A, light may exit the at least one light source 120 through a single light emitting surface (light leaving the light emitting surface is represented by arrows 190a-d).

Figure 2B:
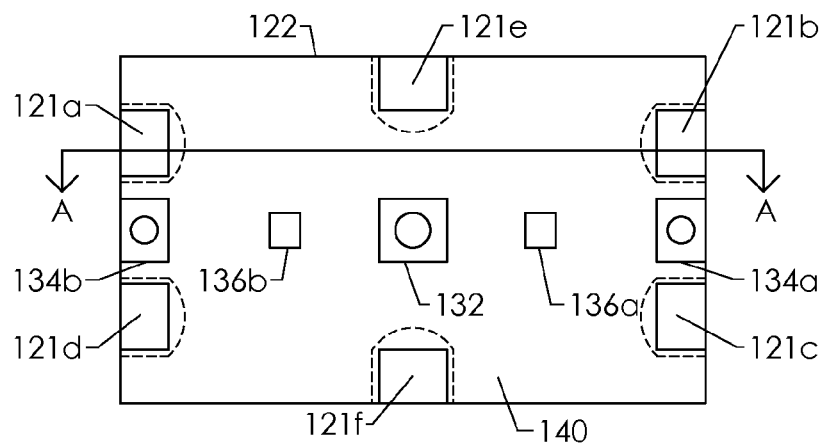
Figure 3A:
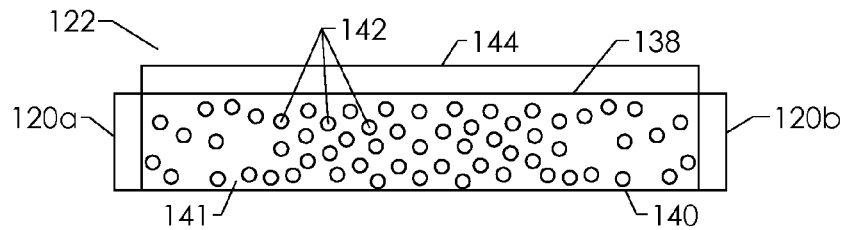
FIGS. 3A-3F illustrates cross-sectional views of different embodiments of the optic, taken along line A-A in FIGS. 2A-2C.
Figure 3B:
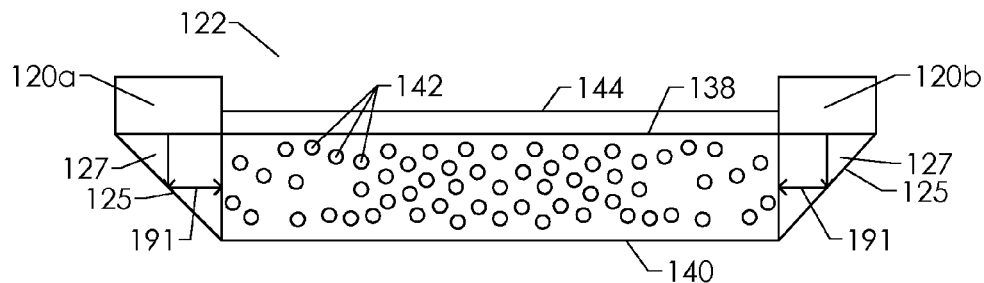
Figure 3C:
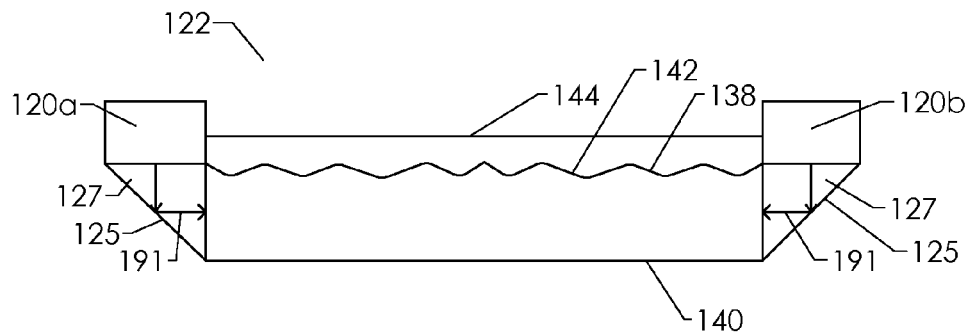

Alternatively, as shown in FIG. 2B the front view of the optical substrate 122 shown in FIG. 2B, and the cross sectional views of the optical substrate 122 shown in FIGS. 3B and 3C, the at least one light source 120 may be positioned on the back major surface 138 at locations 121a-d. In this configuration light may exit the at least one light source 120 through a single light emitting surface (light leaving the light emitting surface) and be reflected from the chamfered edge 125 and directed towards the optical axis in direction 191.

Figure 2C:
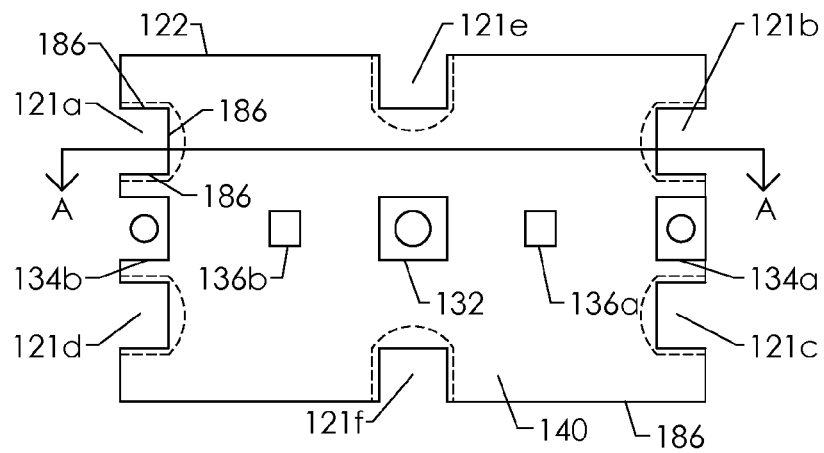

Alternatively, as shown in FIG. 2C, the at least one light source 120 may be positioned within a recess 121 in the optical substrate 122. In this example, the at least one light source 120 may emit light from multiple light emitting surfaces and the light from all of the light emitting surfaces may enter the optical substrate 122.

Figure 2D:
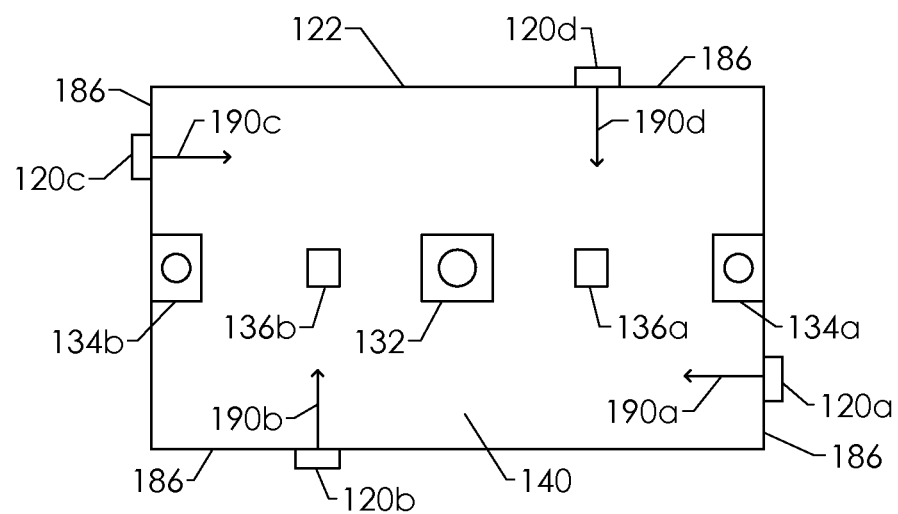

Referring briefly to FIG. 2D, the at least one light source 120 may be reduced to four (4) light sources, each of which is arranged on one exterior edge of the substrate 122 at a location that is not centered on the edge. For example, light source 120a may be on a side edge lower than center while light source 120c may be on the opposing side higher than center. Light source 120d may be on the top edge to the right of center which light source 120b may be on the bottom edge to the left of center.

Referring to FIGS. 1 and 2A, the one or more light sources 120 may comprise multiple LEDs 120a-d. As will be understood by one of ordinary skill in the art, the one or more light sources 120 may comprise any suitable light emitting device. Further, the multiple light sources 120 may emit illumination with different characteristics. For example, a portion of the light sources 120 may be white LEDs while another portion may be red LEDs, or LEDs of another color.

As shown in FIG. 1, the optical substrate 122 may comprise a substantially flat plate. For example, the optical substrate 122 may comprise a clear and colorless acrylic substrate which may be made from any other material suitable for transferring light by total internal reflection. The optical substrate 122 may be positioned within the reader 100 so that a front major surface 140 and a back major surface 138 of the optical substrate 122 are located in a plane that is substantially perpendicular to the optical axis 114. In one embodiment, "substantially perpendicular" means within five degrees of perpendicular while in an alternative embodiment substantially perpendicular means within 15 or 20 degrees of perpendicular.

The light emitted from the optical substrate 122 may have different characteristics depending on the characteristics of the optical substrate 122. For example, the optical substrate 122 may utilize refraction, diffusion, prismatic effect, and/or total internal reflection to direct more diffuse illumination 124 into the field of view 106. Depending on the properties of the optical substrate 122 and the at least one light source 120, the illumination system may be referred to as a diffuse bright field illumination system. The diffuse bright field imaging system may also be called a midfield illumination system or a medium field illumination system.

In one embodiment, the light emitted from the optical substrate 122 may be emitted substantially parallel to the optical axis 114. For example, light may be emitted within 10 degrees of parallel to the optical axis 114. Illumination having a smaller angle spread around the optical axis 114 may be referred to herein as diffuse bright field illumination 124.

Figure 4A:
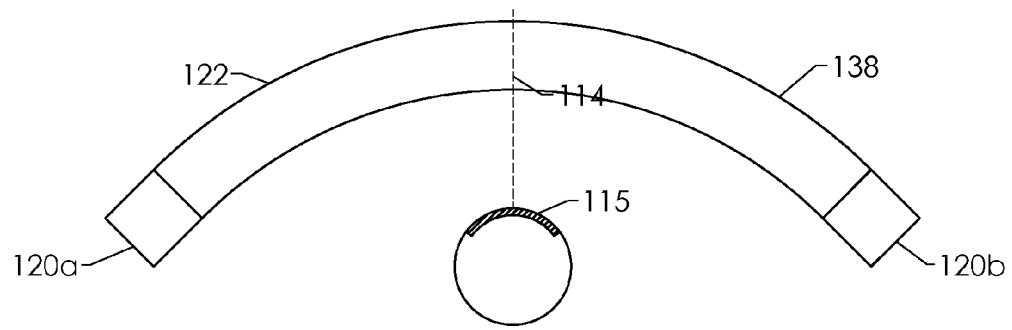
FIGS. 4A-4C are cross-sectional views of alternative embodiments of the optical substrate.
Figure 4B:
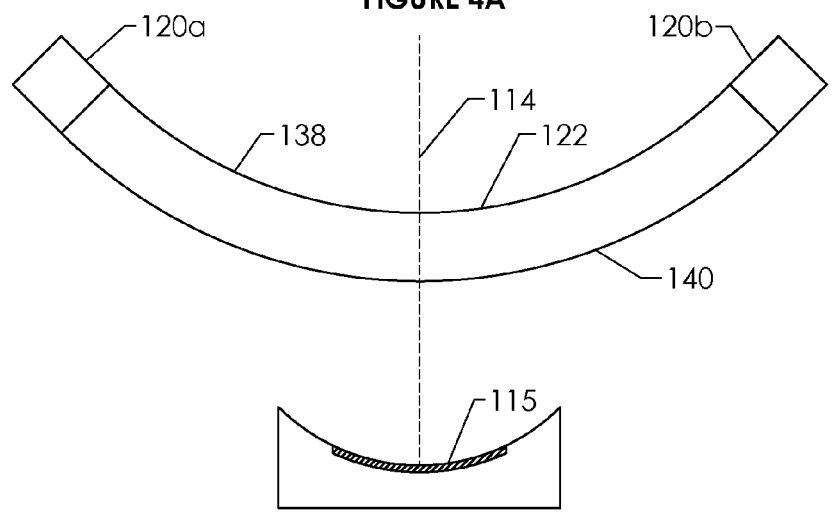
Figure 4C:
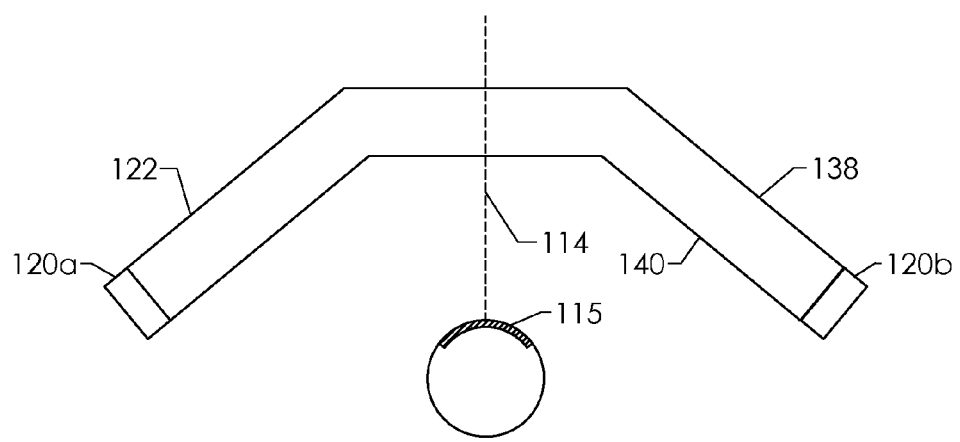

Alternatively, referring to FIGS. 4A to 4C, the optical substrate 122 may be shaped such that the shape of the front major surface 140 and/or the back major surface 138 is concave, convex, parabolic, or some combination thereof. For example, as shown in FIG. 4A, the optical substrate 122 has a generally concave shape front major surface 140 and a convex shaped back major surface 138, while in FIG. 4B, the optical substrate 122 has a generally convex shape front major surface 140 and a concave shaped back major surface 138. The shape of at least one of the front major surface and the back major surface need not be symmetrical, but may be asymmetrical about a plane perpendicular to the optical axis 114.

In FIG. 4C, the front major surface 140 may include three generally planar sections with the central section being generally perpendicular to the optic axis 114 and two generally planar sections adjacent to, and on opposing sides, of the central section being at an angle relative to the optic axis. In one embodiment the angle may be no greater than 45 degrees. In this embodiment the back major surface 138 may also include corresponding sections with the central section being generally perpendicular to the optic axis 114 and two generally planar sections adjacent to, and on opposing sides, of the central section being at an angle relative to the optic axis. In one embodiment, the angle of the two opposing sides of the back major surface 138 may be the same angle as the two opposing sides of the front major surface 140. In another embodiment the angle may be different.

The light emitted by the configurations shown FIGS. 4A 4C may be emitted at different angles relative to the optical axis compared to the illumination system 105 depicted in FIG. 1. the illumination system 105 with these configurations is a diffuse bright field illumination system providing uniform illumination for barcodes applied to a concave/convex surface.

In embodiments in which the illumination system 105 emits diffuse light, the illumination may be optimal for reading a barcode that has a reflective surface that is located in a near zone 158 and/or a center zone 126 of the field of view 106. The center zone 126 may begin at a center zone starting boundary 128 and end at a center zone ending boundary 130. The center zone starting boundary 128 is closer to the reader 100 than a far zone starting boundary 118. For example, the center zone starting boundary 128 may be located approximately 25 mm away from the reader 100. The center zone ending boundary 130 may be located within the far zone 116. Thus, the center zone 126 and the far zone 116 may overlap.

As discussed, the optical substrate 122 may be positioned between the one or more light sources 120. For example, as shown in FIGS. 1, and 2A the one or more light sources 120 may be located along an edge 186 of the optical substrate 122 that is located between the front major surface 140 and the back major surface 138. The one or more light sources 120 introduce light into the edge 186 of the optical substrate. In FIG. 1, light is introduced from the one or more light sources 120 into the optical substrate 122 in a direction generally perpendicular to the optical axis 114 and generally towards the optical axis 114.

For example, as shown in FIG. 3B the one or more light sources 120 may be located along an edge of the back major surface 138 of the optical substrate 122 with the chamfered edge 125 reflecting illumination in a direction between the front major surface 140 and the back major surface 138 in a direction generally perpendicular to the optical axis 114 and generally towards the optical axis 114.

Figure 2E:
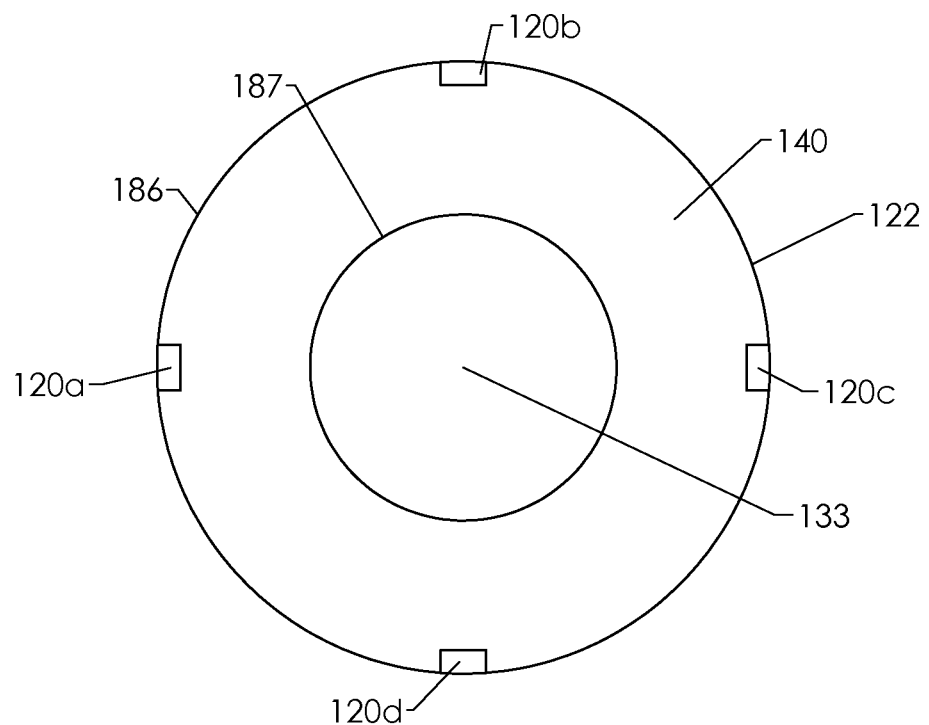

The center of the optical substrate 122 may include an opening 133 or an aperture 132 through which objects (such as a barcode) within the field of view 106 may be visible to the lens 104 and the photo sensor array 102. As shown in FIGS. 2A, 2B, and 2C, the aperture may be rectangular and of sufficient size such that the optical substrate 122 is not within the field of view 106 of the camera 103. As shown in FIG. 2E, the optical substrate 122 may have an approximately annular shape where the center opening 133 of the annular optical substrate 122 is circular and of sufficient size such that the optical substrate 122 is not within the field of view 106 of the camera 103.

With continued reference to FIG. 2C, the optical substrate 122 may have an annular shape that includes an outer edge 186 and an inner edge 187. In the depicted embodiment multiple light sources 120a-d are positioned on the back major surface 140 of the optical substrate 122 and input light into the optical substrate 122 through the back major surface 140. For example, the light sources 120a-d may be positioned as shown in FIG. 3B or 3C. In FIGS. 3B and 3C, the light sources 120a-d input light through the back major surface 140 in a direction approximately parallel to the optical axis 114. After entering the optical substrate 122, the light is reflected by a chamfered surface 125 of the outer edge 186. The chamfered surface 125 is configured to reflect light onto a path relatively perpendicular to the optical axis 114. In another embodiment (not shown) in which the optical substrate has an annular shape, light enters the optical substrate 122 through the outside edge 186 in a direction approximately perpendicular to the optical axis 114.

To prevent the optical substrate 122 from functioning simply as a light pipe or light guide, the optical substrate 122 includes one or more extraction features 142 configured to extract light from the optical substrate 122 and into the field of view 106. The extraction features 142 may introduce a variation in the index of refraction (i.e., a location of non-uniform index of refraction) of the optical substrate 122. Each extraction feature 142 functions to disrupt the total internal reflection of the propagating light that is incident on the extraction feature.

As described above with respect to FIGS. 2A and 2D, the illumination 190a-d directed into the edge 186 of the optical substrate 122 generally propagates through the optical substrate 122 due to total internal reflection. Any illumination 190a-d that is incident on the one or more extraction features 142 may be diffused with a first portion being diffused at an angle such that the illumination continues propagating within the optical substrate 122 (based on total internal reflection) and a second portion may be diffused at an angle (i.e., an escape angle) that overcomes total internal reflection, "escapes" the surface, and is directed into the field of view 106.

The extraction of illumination through the front major surface introduced by the extraction features 142 may comprise at least one of: i) one or more particles within the substrate 122, ii) a planar surface within the optical substrate 122, iii) a variation in the surface topography of the back major surface 138, and iv) a variation in the surface topography of the front major surface 138. For example, in FIGS. 3A and 3B, the optical substrate 122 is embedded with particles 142 having an index of refraction greater or less than the optical substrate 122. As light travels from the edge 186 of the optical substrate 122 through total internal reflection towards a center of the optical substrate 122, the particles 142 disrupt the total internal reflection of the light, causing a portion of the propagating light to exit through the front major surface 140.

The extraction features 142 may be configured to extract light in a defined intensity profile over the front major surface 140, such as a uniform intensity profile, and/or a defined light ray angle distribution. In FIG. 3A, the one or more extraction features 142 are distributed non-uniformly throughout the optical substrate 122. In this example, the one or more extraction features 142 are distributed throughout the optical substrate such that light is uniformly emitted from the front major surface 140 of the optical substrate 122. For example, the extraction features 142 may be spread throughout the optical substrate 122 in concentrations that increase with distance from the at least one light source 120.

Alternatively, in FIG. 3B, the one or more extraction features 142 may be distributed uniformly or non-uniformly throughout the optical substrate. In this example, the one or more extraction features are distributed throughout the optical substrate such that light is not uniformly emitted from the front major surface 140 of the optical substrate 122. Instead the light is emitted from the front major surface 140 in a desired intensity pattern. While not shown, the one or more extraction features 142 may be distributed in alternative patterns that result in the light being emitted from the front major surface 140 of the optical substrate 122 having a more structured appearance (i.e., a non-uniform intensity pattern).

Figure 3D:
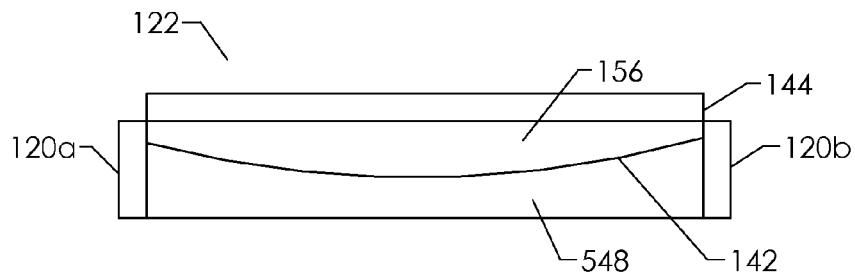
Figure 3E:
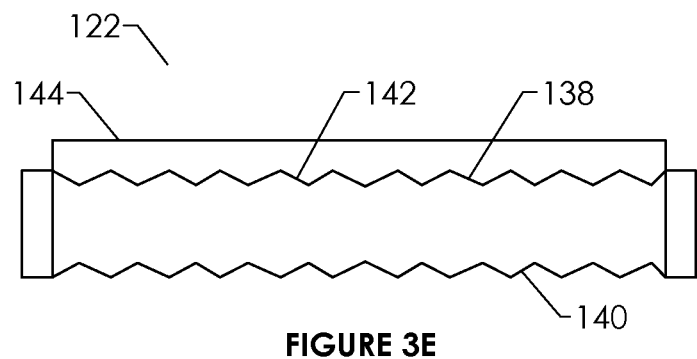

As shown in FIGS. 3C and 3E, the extraction features 142 may also comprise a surface variation in the topography of at least one of the front major surface 140 and the back major surface 138. In the depicted embodiment of FIG. 3C, the one or more extraction features 142 comprise variations in the back major surface 138 of the optical substrate 122. In this example, the front major surface 140 of the optical substrate 122 is smooth and planar, while the back major surface 138 includes a topography of convex and concave indentations and protrusions. In the depicted embodiment of FIG. 3E, both the back major surface 138 and the front major surface 140 include extraction features 142 comprising convex and concave indentations and protrusions.

These embodiments are configured to result in a homogenous output of light from the front major surface 140.

The convex and concave indentations and protrusions may be: i) features 142 with specific optical properties, such as micro lenses formed by, for example, molding or laser cutting; or ii) features 142 with no specific optic properties (i.e. random) such as a roughened surface formed by any of a textured tool or sanding of the surface after molding. Further, the shape, density, or other optical properties of the extraction features 142 may increases with distance from the light source 120a-d in order to produce uniform illumination from the optical substrate.

Figure 3F:
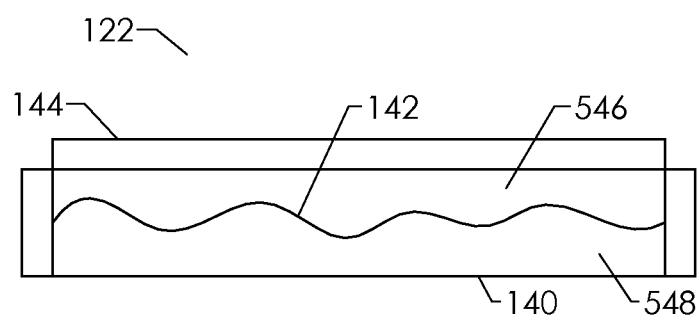

Turning to FIGS. 3D and 3F, the one or more extraction features 142 comprise a surface within the optical substrate 122. In this embodiment, the optical substrate 122 may be made of two different materials 546, 548. These materials 546, 548 may have different indices of refraction, and they may be in contact with one another. In FIG. 3E, the contact is along a surface forming the one or more extraction features 142. In FIG. 3F the contact is along a surface of convex and concave shapes, either patterned or random. Refraction at the one or more extraction features 142 directs illumination towards the front major surface 140 of the optical substrate 122 at an angle where the illumination exits the front major surface 140 towards the field of view 106. As a variation to these embodiments, the materials 546, 548 may have the same index of refraction, but a material with a different index of refraction may be sandwiched between the materials 546, 548 at the non-planar contact surface 550.

As will be understood by one of ordinary skill in the art, the optical substrate 122 and the extraction features 142 are not limited to these described embodiments. Other embodiments of the optical substrate 122 including extraction features 142 are also within the scope of the present disclosure.

In all of these embodiments, to further increase the quantity of illumination exiting through the front major surface 140, a reflective backing 144 may be applied to the back major surface 138. The reflective backing 144 may be applied uniformly such that it covers the entire back major surface 138. The reflective backing 144 reduces the amount of light that escapes through the back major surface 138 by reflecting light back inward into the optical substrate 122. In another embodiment, a cladding film (not shown) having an index of refraction less than the index of refraction of the optical substrate 122 is adjacent the back major surface 138. The cladding film reduces the amount of light that escapes by reflecting light inward through total internal reflection. Similarly, all edges and surfaces of the optical substrate 122 (except for the edges 186 where the one or more light sources 120a-d project illumination into the optical substrate 122) may also be coated with a reflective backing 144.

Depending on the properties of the illumination system 105, the light emitted by the illumination system 105 from the one or more light sources 120 may not be sufficiently bright to provide optimal illumination for reading a barcode that is located farther away from the reader 100 than the center zone ending boundary 130. For this reason, as shown in FIG. 1, the illumination system may comprise at least one secondary light source 108. The at least one secondary light source 108 may be referred to as a direct bright field illumination system or a far field illumination system. Light from the at least one secondary light source 108 that is emitted by the illumination system 105 may converge at a point on the optical axis 114 that is different from the point along the optical axis 114 that light from the at least one light source 120 converges. For example, the light may be emitted by the illumination system 105 at an angle closer to parallel to the optical axis 114, for example at a convergence angle of approximately 70 degrees) than the light from the at least one light source 120 that is emitted by the illumination system 105.

The at least one secondary light source may comprise one or more LEDs 108a-b, which may be positioned behind refracting and/or diffusing optics 110a-b. The one or more secondary light sources 108a-b may direct illumination 112 into the field of view 106 substantially parallel to the optical axis 114 but with a slight convergence angle. For example, the one or more secondary light sources 108a-d may direct illumination into the field of view 106 at an angle from 0-30 degrees from the optical axis 114. This illumination 112 may be referred to herein as direct bright field illumination 112 or far field illumination. As indicated above, the optical axis 114 is a line originating from the center of the focusing lens 104 and extending outward into the center of the field of view 106.

Light emitted by the illumination system from the at least one secondary light source may be better suited for reading a barcode with a diffuse surface such as a paper label. Light emitted by the illumination system from the at least one secondary light source may also be optimal for reading a barcode that is located in a far zone 116 of the field of view 106, i.e., an area of the field of view 106 that is relatively far away from the reader 100. In other words, light from the at least one secondary light source may have sufficient intensity to illuminate a barcode that is located within the far zone 116. The far zone 116 may begin at a far zone starting boundary 118 and end at a far zone ending boundary 119. In one implementation, the far zone starting boundary 118 may be located about 75 mm away from the reader 100. The bright field illumination 112 may not be sufficiently diffuse to provide optimal illumination for reading a barcode that has a reflective surface. For longer range reading, the illumination system may additionally comprise a focus lens associated with the at least one secondary light source in order to provide illumination for reading a barcode that is located farther away from the reader 100 than the far zone ending boundary 119.

The optical substrate 122 may further include apertures 134a-b that permit the direct bright field illumination 112 (from the at least one secondary light source 108a-b) to be directed into the field of view 106 without being affected by the optical substrate 122. Further yet, the optical substrate 122 may include apertures 136a-b that permit targeting illumination from targeting light sources 109a-b (FIG. 1) mounted behind the optical substrate 122 to be projected into the field of view 106 without being affected by the optical substrate 122.

The secondary light source may include secondary light sources 108a, 108b mounted within the housing 101. Secondary light sources 108a, 108b are the interior of the housing 101 and may be behind tertiary light sources 152a-b (discussed herein) which are behind diffusors 154a, 154b. The secondary light sources 108a, 108b may be in front of the tertiary light sources 152a, 152b. As will be discussed with respect to FIG. 6, the secondary light sources may also be positioned in front of the illumination sources 120a, 120b but behind the tertiary light sources 152a-b.

The surfaces of the apertures 132, 134a-b, 136a-b within the optical substrate 122 may be coated with an opaque reflective material (not shown). This material may cause illumination within the optical substrate 122 that is incident on the surface of a particular aperture to be reflected back into the optical substrate 122 regardless of its angle of incidence. Reflecting illumination back into the optical substrate 122 prevents illumination from exiting the optical substrate 122 through the surface of any aperture at an angle where it would illuminate the region behind the optical substrate 122, such as directly illuminating the lens 104 and degrading the quality of the image of an object within the field of view 106.

Referring again to FIG. 1, the illumination system 105 may also include at least one tertiary light source 152. Light from the at least one tertiary light source 152 may be emitted by the illumination system 105 at an angle closer to perpendicular to the optical axis 114 than the light from either of the at least one light source 120 or the at least one secondary light source 108 that is emitted by the illumination system 105. The at least one tertiary light source 152 may comprise multiple LEDs 152a-b. Additional optics 154a-b may also be associated with the at least one tertiary light source 152 to direct illumination to the field of view 106. The additional optics 154a-b may utilize refraction, diffusion, prismatic effect, and/or total internal reflection to direct illumination 156a-b into the field of view 106.

The at least one tertiary light source 152 may be referred to as a dark field illumination system or a near field illumination system. Light emitted by the illumination system from the at least one tertiary light source may be referred to herein as dark field illumination 156a-b. Light from the at least one tertiary light source may be emitted by the illumination system (i.e., the dark field illumination 156a-b) at an angle no more than 45° from a plane perpendicular to the optical axis 114.

The dark field illumination 156a-b may be optimal for reading a barcode that is located within a close zone 158 of the field of view 106. The close zone 158 may begin at a close zone starting boundary 160 and may end at a close zone ending boundary 162. The close zone starting boundary 160 may be closer to the reader 100 than the center zone starting boundary 128. The close zone starting boundary 160 may correspond to the face of the reader 100. The close zone ending boundary 162 may be within the center zone 126. Thus, the close zone 158 and the center zone 126 may overlap. However, the dark field illumination 156a-b may not be sufficiently bright to provide optimal illumination for reading a barcode that is located farther away from the reader 100 than the close zone ending boundary 162.

In the embodiment shown in FIG. 1, the at least one tertiary light source 152a-b is mounted on circuit boards at the sides of the reader housing 101. The optics 154a-b may comprise lenses, gratings, or diffusion material that diffuses the illumination 156a-b from the at least one tertiary light source 152.

Figure 5:
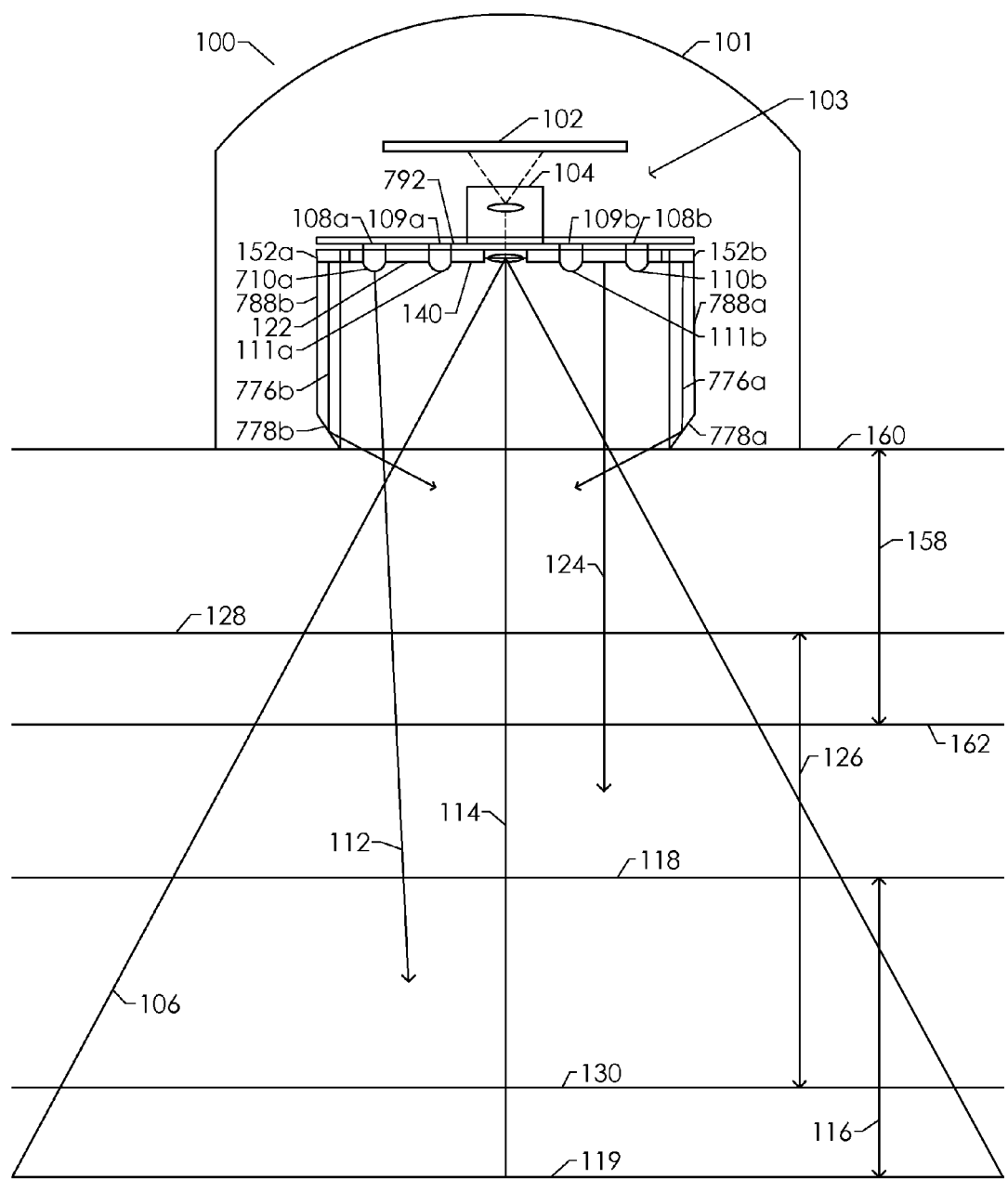
FIG. 5 is a top-down view of another embodiment of a barcode reader in accordance with the present disclosure.

With reference to FIG. 5, an alternative embodiment of the barcode reader 100 is depicted. In this embodiment, the at least one tertiary light source 152*a-b* is mounted on a circuit board 792 that is substantially perpendicular to the optical axis 114. Illumination 776*a-b* from the at least one tertiary light sources 152*a-b* is directed substantially parallel to the optical axis 114 toward prism optics 778*a-b*. More specifically, the at least one tertiary light source 152*a-b* may project illumination 776*a-b* into light pipes 788*a-b*, which use total internal reflection to propagate the illumination 776*a-b* toward the prism optics 778*a-b*. The prism optics 778*a-b* are used to re-direct the illumination 776*a-b* toward the field of view 106 at the desired angle.

The light pipes 788*a-b* may comprise chamfered ends 778*a-b*. These chamfered ends 778*a-b* may serve as the prism optics 778*a-b* that re-direct the illumination 776*a-b* toward the field of view 706. Each of the chamfered ends 778*a-b* may be angled such that total internal reflection redirects the illumination 776*a-b* at a non-zero angle (e.g., 45°) relative to the plane that is perpendicular to the optical axis 714. The illumination 776*a-b* may exit the light pipes 788*a-b* through the side facing the optical axis 714. It should be appreciated that the light pipes 778*a*-778*b* are shown in cross section and may be on each side of the camera (all four sides, left, right, top, bottom) or may even form an annular ring around the field of view of the camera.

Figure 6:
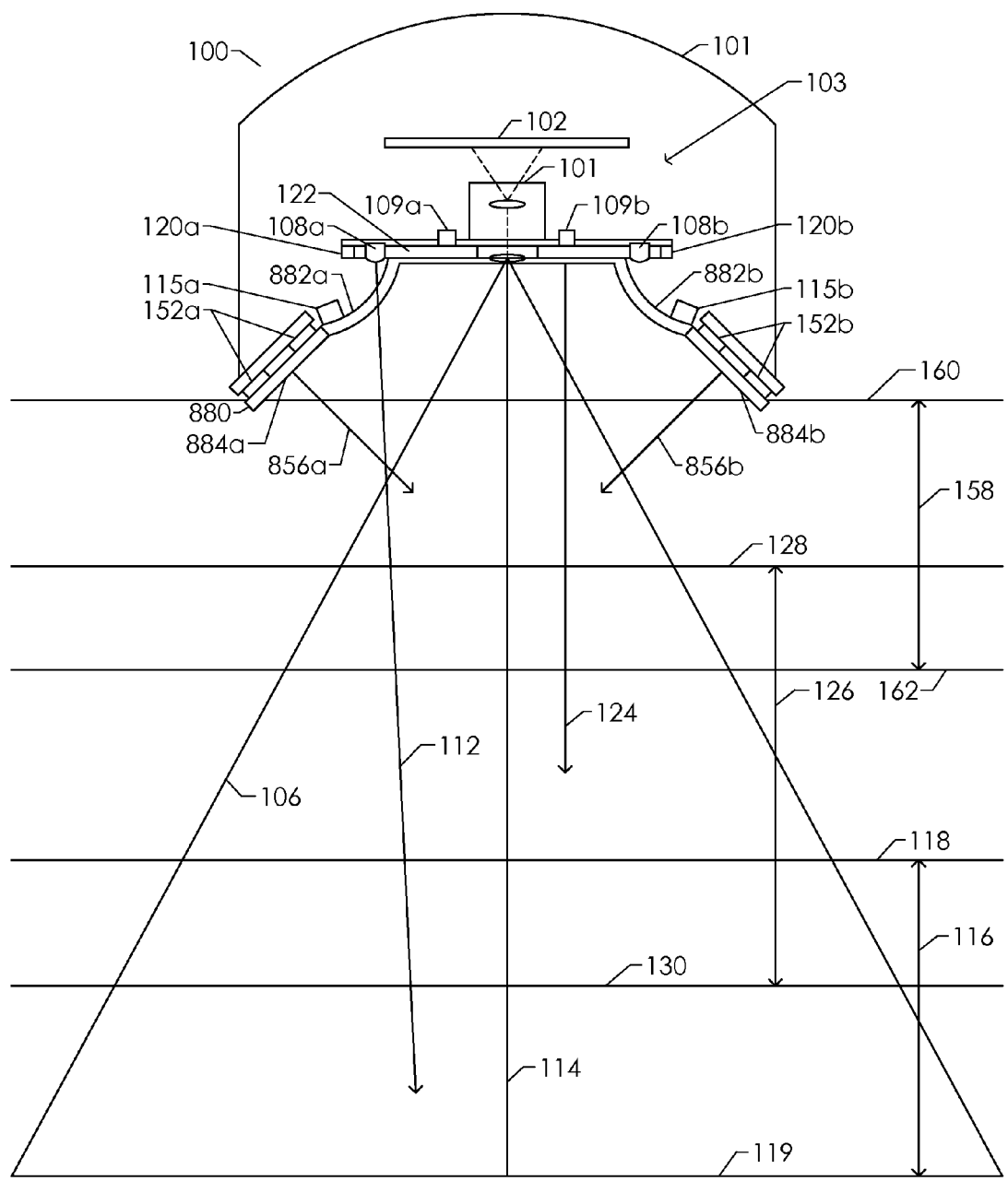
FIG. 6 is a top-down view of another embodiment of a barcode reader in accordance with the present disclosure.

Turning to FIG. 6, another embodiment of the barcode reader 100 is shown. In this embodiment, the optical substrate 880 forms a protective window over optical substrate 122 and replaces the optics 110*a-b*, and 154*a-b* of FIG. 1. In this example, the at least one tertiary light source 152 comprise LEDs 152*a-b* positioned behind diffusion regions 884*a-b* of the optical substrate 880. The diffusion regions 884*a-b* direct dark field illumination 856*a-b* from the LEDs 152*a-b* into the field of view 806. The curved regions 882*a-b* provide structural support for the diffusion regions 884*a-b* as well as focusing the illumination projected from secondary illumination sources 108*a*, 108*b*—or secondary illumination sources 115*a*, 115*b*.

Figure 7:
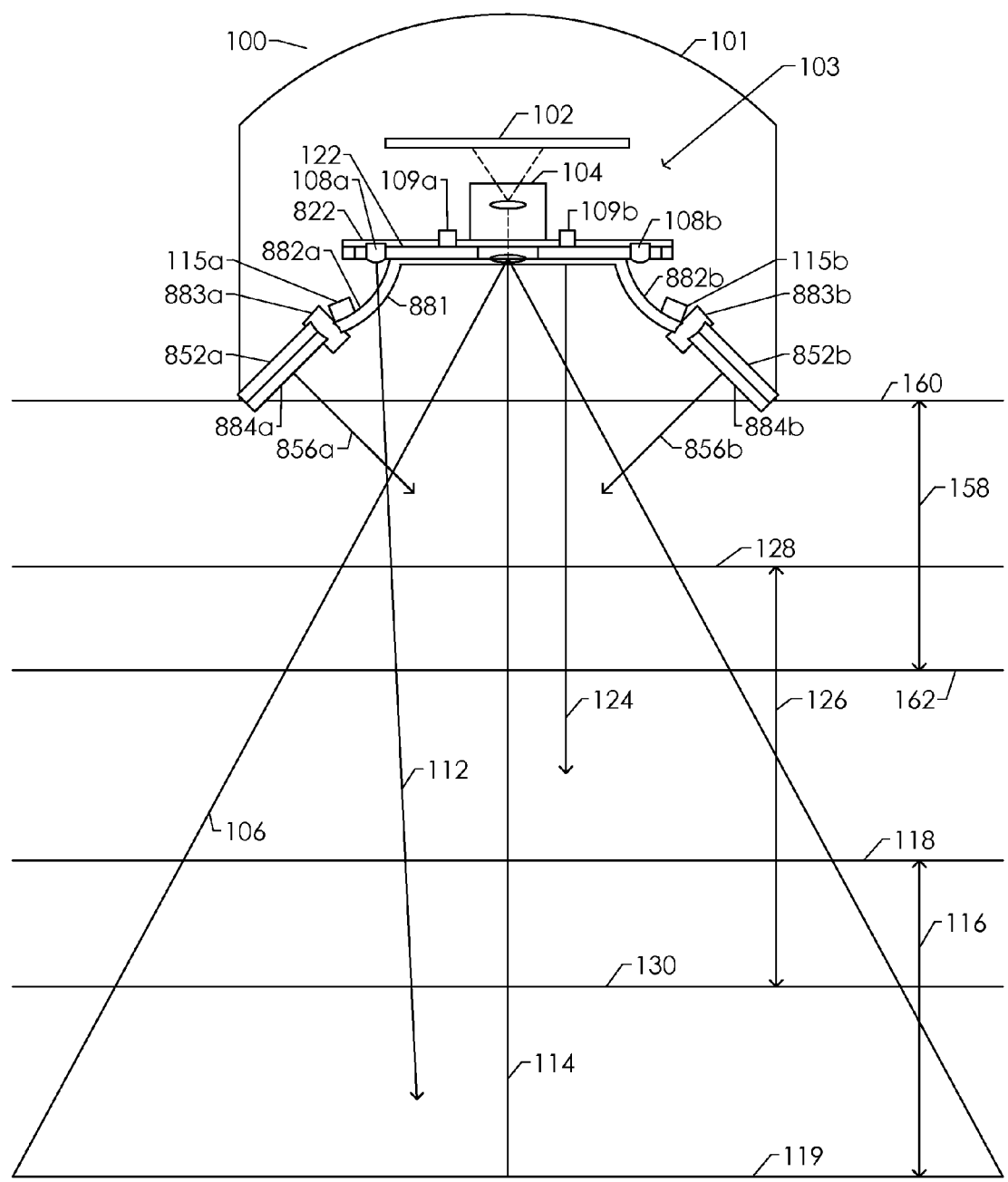
FIG. 7 is a top-down view of an additional embodiment of a barcode reader in accordance with the present disclosure.

Turning to FIG. 7, another embodiment of the barcode reader 100 is shown. In this embodiment, the optical substrate 881 forms a protective window over optical substrate 122 and replaces the optics 110*a-b* of FIG. 1.

Figure 8A:
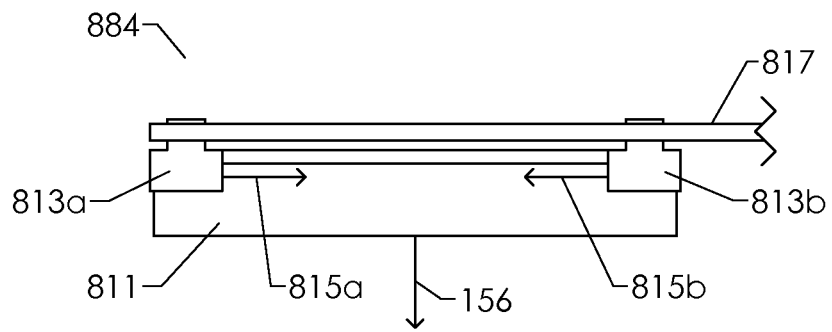
FIGS. 8A-8B are cross-sectional views of tertiary light sources illuminating the optical substrate in two embodiments of the barcode reader.

As shown in FIG. 8A, the illuminators 884 may include an optical substrate into which illumination 815*a-b* is projected by two side fire illuminators 813*a-b*. The illumination 815*a-b* is internally reflected within the substrate 811 and extracted as diffuse illumination 156 from the optical substrate 811. The optical substrate 811 may have any of the characteristics, and extraction features, as the optical substrate 122 as described with respect to FIGS. 1, 2A-D, 3A-F, and 4A-C, as well as reflective coatings such that illumination propagates between a front major surface and a back major surface of optic 811 and it extracted through the front major surface as illumination 156.

Figure 8B:
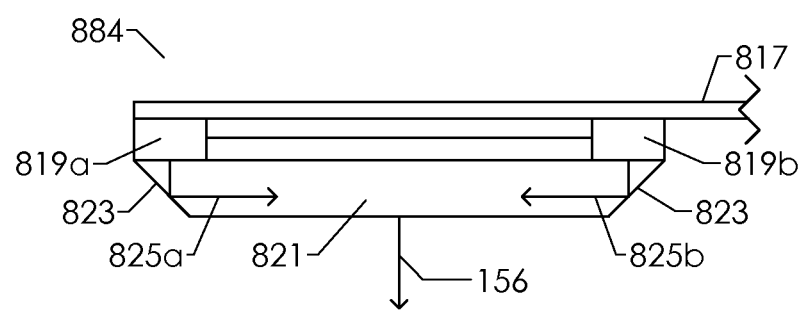

As shown in FIG. 8B, the illuminators 884 may include an optical substrate 821 into which illumination 825*a-b* is projected through the back major surface by two illuminators 819*a-b*. The illumination 825*a-b* is reflected from chamfered surfaces such that it propagates between the front major surface and the back major surface and is extracted as diffuse illumination 156 from the optical substrate 821. As with optical substrate 811, the optical substrate 821 may have any of the characteristics, and extraction features, as the optical substrate 122 as described with respect to FIGS. 1, 2A-D, 3A-F, and 4A-C, as well as reflective coatings such that illumination propagates between a front major surface and a back major surface of optic 811 and it extracted through the front major surface as illumination 156.

The diffusion regions 884*a-b* direct dark field illumination 856*a-b* from the LEDs into the field of view 806. The curved regions 882*a-b* provide structural support for and focusing the illumination projected from secondary illumination sources 108*a*, 108*b*—or secondary illumination sources 115*a*, 115*b*. Posts 883*a* and 883*b* provide structural support for the dark field illumination systems 884*a-b* and prevent illumination from entering into the curved regions 882*a-b*.

The previous discussion has been directed to a barcode reader that includes three different light sources: at least one secondary light source (a bright field illumination system—positioned at any of: i) closer to the field of view (i.e. in front of) than the tertiary light sources, ii) behind the tertiary light sources but in front of the diffuse bright field illumination sources; or iii) behind the diffuse bright field illumination sources and optical substrate 122), at least one light source (a diffuse bright field illumination system), and at least one tertiary light source (a dark field illumination system).

It should also be appreciated that each of these illumination sources may generate illumination with different characteristics. For example, the diffuse bright field illumination may be white LEDs (illumination with intensity across a wide spectrum of wave lengths) while the tertiary light source and the secondary light source may be red LEDs (i.e. intensity at 660 nm).

These three illumination systems can be independently operated such that a barcode can be read with the illumination system that provides the best illumination for reading the barcode. The discussion that follows includes some examples of how this may be accomplished. Although some of these examples involve only two different illumination systems, those examples may be extended to barcode readers that include three (or more) different illumination systems.

Photo sensor arrays can be operated in two modes: a rolling shutter mode of operation and a global shutter mode of operation. In the global shutter mode of operation, all photo sensors within the array (i.e., all rows of the array) may be exposed at the same time for the duration of an exposure period. During the exposure period charge may accumulate on each photo sensor based on the incident illumination. At the end of the exposure period the charge may be read out row by row.

In the rolling shutter mode of operation, two different signals may be utilized: a reset signal and a read signal. The reset signal may affect all of the photo sensors in a row and may put the photo sensors in a state to convert light intensity into an electrical signal. The read signal may similarly be applied to all of the photo sensors in a row, and may cause the electrical signals from each photo sensor in the row to be read electronically.

To capture an image, the reset signal may be applied sequentially to each row in the photo sensor array, starting at the top of the photo sensor array and proceeding row-by-row to the bottom of the photo sensor array. At some fixed time interval after this reset process has started, the readout process may begin, i.e., the read signal may be applied sequentially to each row in the photo sensor array. The "exposure" of a row of photo sensors refers to the period of time between the row of photo sensors being reset and the row of photo sensors being read.

The exposure time may be expressed as an integer value. The actual exposure time may be the integer value multiplied by the duration of time required to read out a single row. As such, the size of the rolling "exposure zone" may be the quantity of lines represented by the integer value. For example, if the exposure value is 10, when exposure of row 1 is complete and read out of row 1 starts, row 11 would start exposure and be exposed for the duration of read out of rows 1 to 10.

In both the global shutter mode of operation and the rolling shutter mode of operation, windowing may be utilized. When windowing is utilized, only a portion of the photo sensor array (typically a horizontal window) is used for exposure and read out. Because only a portion of the photo sensor array is used for exposure, imaging a barcode using windowing is faster than using the entire photo sensor array. For example, for the global shutter mode a window of 128 rows between rows 128 and 256 may be simultaneously exposed for an exposure duration, and the accumulated charge may be read out row by row. In this example, there is no read out of rows below 128 or above 256. In the rolling shutter mode, a window of 128 rows between rows 128 and 256 may be exposed and read out using a rolling exposure zone as discussed above. Again there would not be any read out of rows below 128 or above 256.

Figure 9:
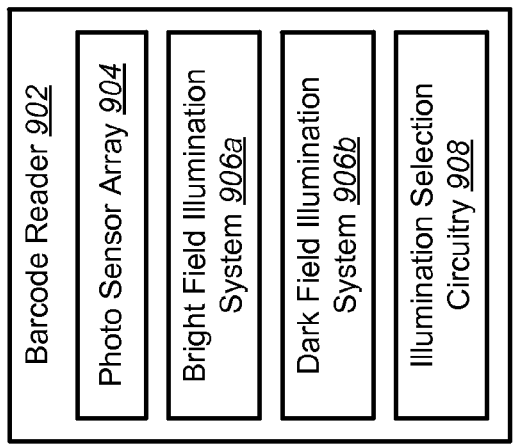
FIG. 9 illustrates one configuration of a barcode reader in accordance with the present disclosure.

As indicated above, the present disclosure relates generally to techniques for selecting the type of illumination that will be most suitable for reading a barcode in a particular situation. FIG. 9 illustrates one configuration of a barcode reader 902 in accordance with the present disclosure.

The barcode reader 902 includes a photo sensor array 904. The photo sensor array 904 may be capable of operating in accordance with a global shutter mode of operation and/or a rolling shutter mode of operation, as discussed above. The photo sensor array 904 may also be capable of utilizing windowing, as discussed above.

The barcode reader 902 also includes a plurality of illumination systems 906a-b having different illumination characteristics. Some examples of different illumination characteristics include the angle of illumination with respect to an optical axis, the intensity of illumination, the wavelength of illumination, diffusion characteristics of the illumination, etc.

The plurality of illumination systems 906 may include a bright field illumination system 906a and a dark field illumination system 906b. The bright field illumination system 906a may provide illumination having characteristics designed to illuminate a target area that is located relatively far away from the reader 902. Conversely, the dark field illumination system 906b may provide illumination having characteristics designed to illuminate a target area that is located relatively close to the reader 902.

Of course, the number of illumination systems 906a-b shown in FIG. 9 is for purposes of example only. In an alternative configuration, a barcode reader may include more than two different illumination systems. Alternatively still, a barcode reader in accordance with the present disclosure may include a single illumination system that is configured to provide illumination having different illumination characteristics (e.g., by changing the intensity, wavelength, angle, and/or diffusion characteristics of the illumination).

The barcode reader 902 also includes illumination selection circuitry 908. The illumination selection circuitry 908 may be configured to perform operations that are related to selecting the type of illumination that will be most suitable for reading a barcode in a particular situation.

Figure 10:
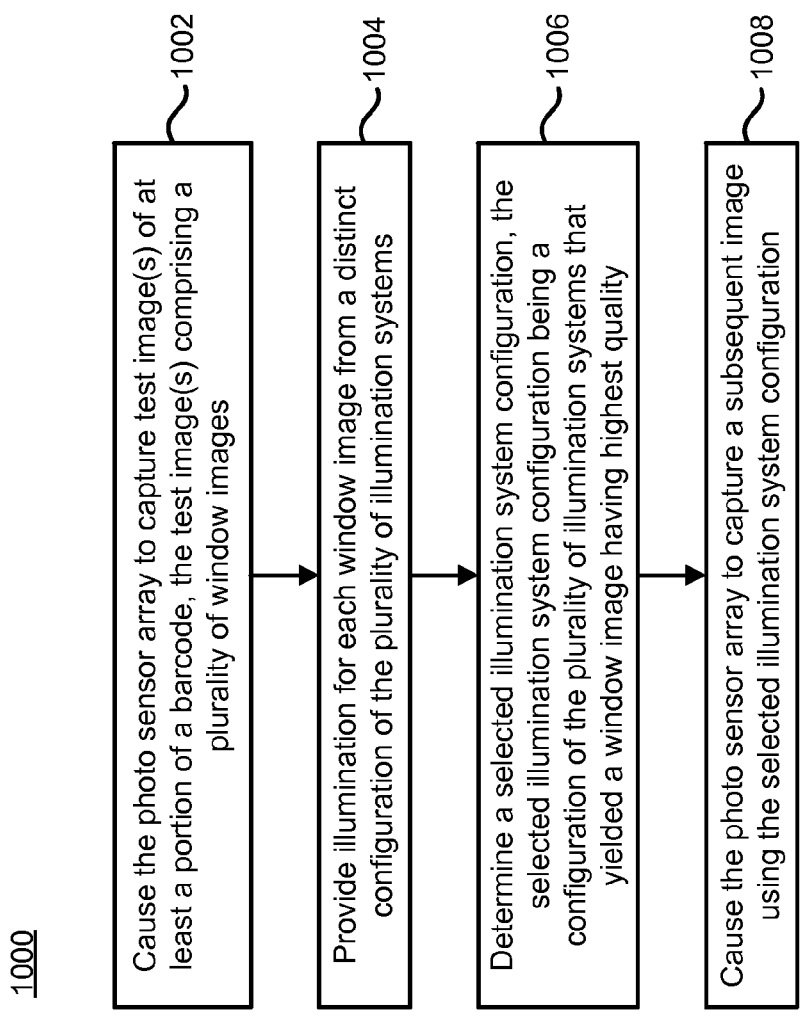
FIG. 10 illustrates an example of a method that may be performed by the illumination selection circuitry of the barcode reader in accordance with the present disclosure.

FIG. 10 illustrates an example of a method 1000 that may be performed by the illumination selection circuitry 908 in accordance with the present disclosure. The circuitry 908 may be configured to cause the photo sensor array 904 to capture 1002 at least one test image. For example, the photo sensor array 904 may capture 1002 a single test image 1210 (see, e.g., FIGS. 11 and 12). Alternatively, the photo sensor array 904 may capture 1002 a plurality of test images 1210a-b (see, e.g., FIGS. 13, 14A and 14B).

The photo sensor array 904 may utilize windowing when the test image(s) are captured 1002, so that the test image(s) may each be smaller than a full photo sensor array image. As used herein, the term "full photo sensor array image" refers to an image that is captured when an entire photo sensor array 904 is exposed and read out. Thus, a full photo sensor array image may include pixels corresponding to all of the photo sensors in the photo sensor array 904. In contrast, the test image(s) may each include pixels corresponding to only a subset (i.e., less than all) of the photo sensors in the photo sensor array 904. Capturing a test image that includes pixels corresponding to only a subset of the photo sensors in the photo sensor array 904 takes less time than capturing a full photo sensor array image.

The test image(s) may include at least a portion of a barcode. That is, only a portion of a barcode (i.e., less than an entire barcode) may be visible in the test image(s). Alternatively, an entire barcode may be visible in the test image(s).

The test image(s) may include a plurality of window images. As used herein, the term "window image" refers to an image that is smaller than a full photo sensor array image. In one possible configuration, a single test image 1210 may be captured, and the single test image 1210 may comprise a plurality of window images 1212a-b. (See, e.g., FIG. 12.) In another possible configuration, a plurality of test images 1410a-b may be captured, and each test image 1410 may comprise a window image 1412. (See, e.g., FIGS. 14A-14B.)

Returning to FIG. 10, the circuitry 908 may be configured to provide 1004 illumination for each window image from a distinct configuration of the plurality of illumination systems 906a-b. For example, if the barcode reader 902 includes a bright field illumination system 906a and a dark field illumination system 906b, the test image(s) may include at least two different window images. The illumination for capturing a first window image may be provided solely by the bright field illumination system 906a, and the illumination for capturing a second window image may be provided solely by the dark field illumination system 906b.

Alternatively, multiple illumination systems 906a-b may be activated at the same time with various permutations of balanced intensity. For example, the illumination for capturing the first window image may be provided by the bright field illumination system 906a at 60% power and the dark field illumination system 906b at 40% power. The illumination for capturing the second window image may be provided by the bright field illumination system 906a at 40% power and the dark field illumination system 906b at 60% power.

The circuitry 908 may also be configured to determine 1006 a selected illumination system configuration. The selected illumination system configuration may be a configuration of the plurality of illumination systems 906a-b that yielded a window image having highest quality among the plurality of window images.

Generally speaking, the quality of an image of a barcode may be measured in terms of the contrast between the light cells and the dark cells within the barcode. A barcode image having relatively high contrast between dark cells and light cells may be considered to have higher quality than another barcode image having relatively low contrast between dark cells and light cells.

The terms "dark cells" and "light cells" are used herein because barcodes have traditionally been printed with ink. This gives barcodes the appearance of having dark cells (the portion that is printed with ink) and light cells (the unprinted substrate background, typically white). However, with direct part mark technology, ink is not always used and other techniques (e.g., laser/chemical etching and/or dot peening) may be used instead. Such techniques may be utilized to create a barcode by causing different portions of a substrate to have different reflective characteristics. When these different portions of the substrate are imaged, the resulting barcode image may have the appearance of including dark cells and light cells. Therefore, as used herein, the terms "dark cells" and "light cells" should be interpreted as applying to barcodes that are printed with ink as well as barcodes that are created using other technologies.

The contrast between the dark cells and the light cells in a barcode may be a function of illumination. Ideally, it is desirable to provide illumination that is consistent across the barcode and of an intensity such that the exposure of the image yields both dark cells and light cells that are within the dynamic range of the photo sensor array 904. This yields better contrast than any of the following: (i) a dimly lit barcode; (ii) a brightly lit barcode wherein the image is washed out beyond the dynamic range of the photo sensor array 904; (iii) an unevenly lit barcode with bright washed out spots; or (iv) a barcode illuminated with illumination that is not compatible with the reflectivity characteristic(s) of the cells of the barcode. An example of (iv) is that illumination directed from the sides of the field of view yields a higher contrast image of a barcode formed by etching technology than does illumination parallel to the optical axis.

If the quality of a window image is measured in terms of contrast, determining 1006 the selected illumination system configuration may include determining which window image of the plurality of window images has highest contrast between light and dark cells of the barcode, and determining which configuration of the plurality of illumination systems 906*a-b* was activated when the window image having the highest contrast was captured.

Alternatively, the quality of the window images may be measured in terms of the presence of desired barcode features and/or patterns. A score or metric may be calculated for each window image. A particular window image's score/metric may indicate the number of desired barcode features and/or patterns that are detected in the window image. For example, a higher score/metric may indicate a greater number of desired barcode features and/or patterns (or vice versa). If the quality of the window images is measured in this way, then determining 1006 the selected illumination system configuration may include determining which window image of the plurality of window images has the most favorable score/metric based on features or patterns of the barcode, and determining which configuration of the plurality of illumination systems 906*a-b* was activated when the window image having the most favorable score/metric was captured.

The circuitry 908 may also be configured to cause the photo sensor array 904 to capture 1008 a subsequent image using the selected illumination system configuration. The subsequent image may be captured using a global shutter or a rolling shutter mode of operation. As indicated above, the test image(s) may include only a portion of a barcode (i.e., only part of the barcode may be visible within the test image(s)). However, the subsequent image may include an entire barcode (i.e., the entire barcode may be visible within the subsequent image).

The subsequent image may be a full photo sensor array image. That is, the subsequent image may include pixels corresponding to all of the photo sensors in the photo sensor array 904. Alternatively, the subsequent image may include pixels corresponding to substantially all of the photo sensors in the photo sensor array 904. In this context, the phrase "substantially all" of the photo sensors in the photo sensor array 904 may mean at least 95% of the photo sensors in the photo sensor array 904.

Figure 10A:
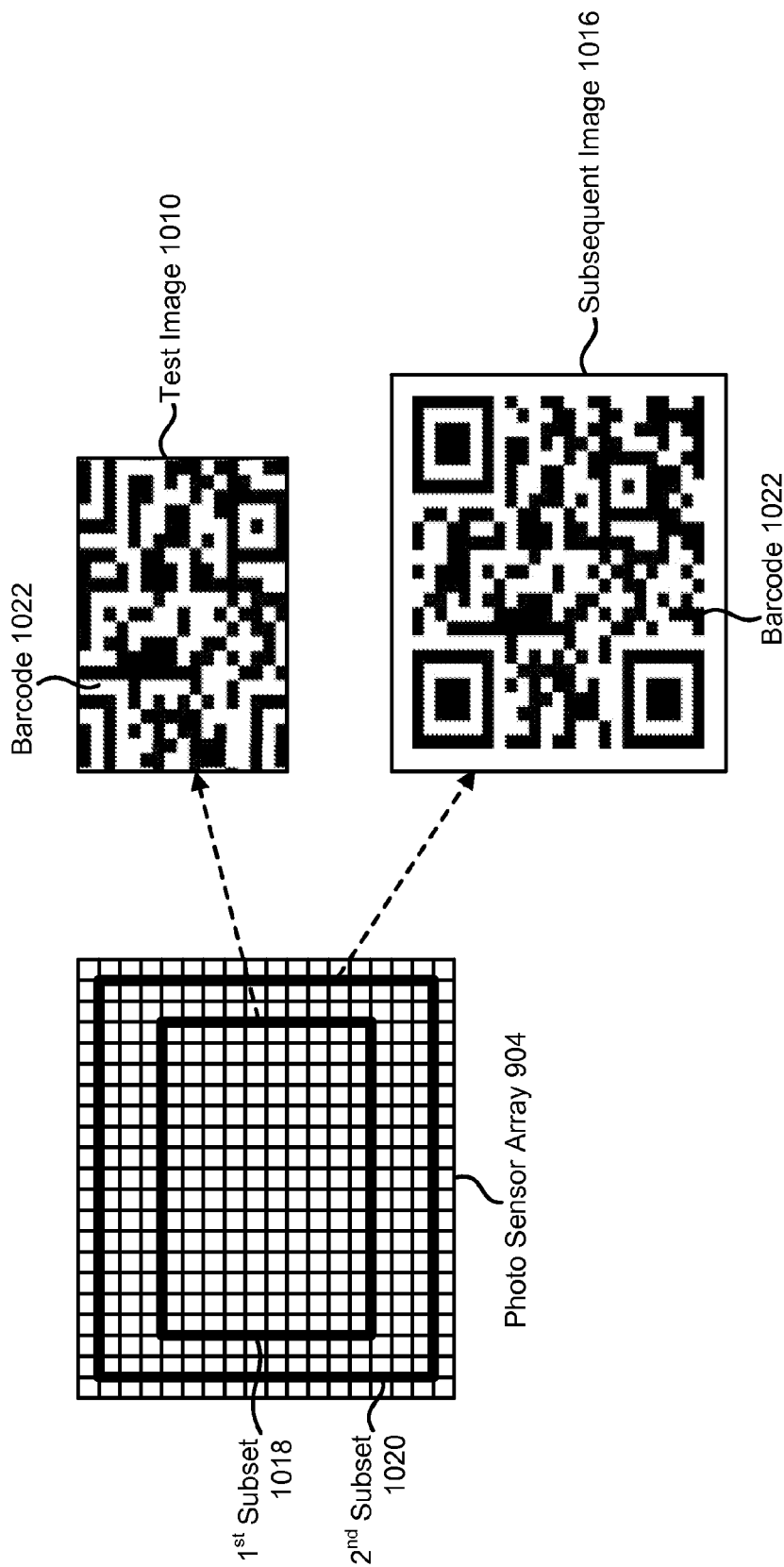
FIG. 10A illustrates an example showing the relative size of a test image compared with a subsequent image.

Alternatively still, the size of the subsequent image may be larger than the test image(s), but less than a full photo sensor array image. For example, referring to FIG. 10A, a test image 1010 may include pixels corresponding to a first subset 1018 of the photo sensors in the photo sensor array 904, and the subsequent image 1016 may include pixels corresponding to a second subset 1020 of the photo sensors in the photo sensor array 904. The second subset 1020 may be larger than the first subset 1018. However, the second subset 1020 may not include all of the photo sensors in the photo sensor array 904.

The size and location of the second subset 1020 may be determined based on defined rules. For example, the size and location of the second subset 1020 may correspond to the size and location of a previously read barcode. Alternatively, the size and location of the second subset 1020 may be determined by estimating the border of the barcode 1022 in the test image 1010 based on characteristics of the barcode 1022 visible in the test image 1010, and then setting the size and location of the second subset 1020 to include the estimated border.

As another example, if the dark field illumination system 906*b* yields a higher quality window image than the bright field illumination system 906*a*, then the entire photo sensor array 904 may be utilized to capture the subsequent image 1016 (because the "up close" barcode 1022 will be larger). Conversely, if the bright field illumination system 906*a* yields a higher quality window image than the dark field illumination system 906*b*, then a subset 1020 (e.g., a central portion) of the photo sensors within the photo sensor array 904 may be utilized to capture the subsequent image 1016 (because the "far away" barcode 1022 will be smaller).

Figure 11:
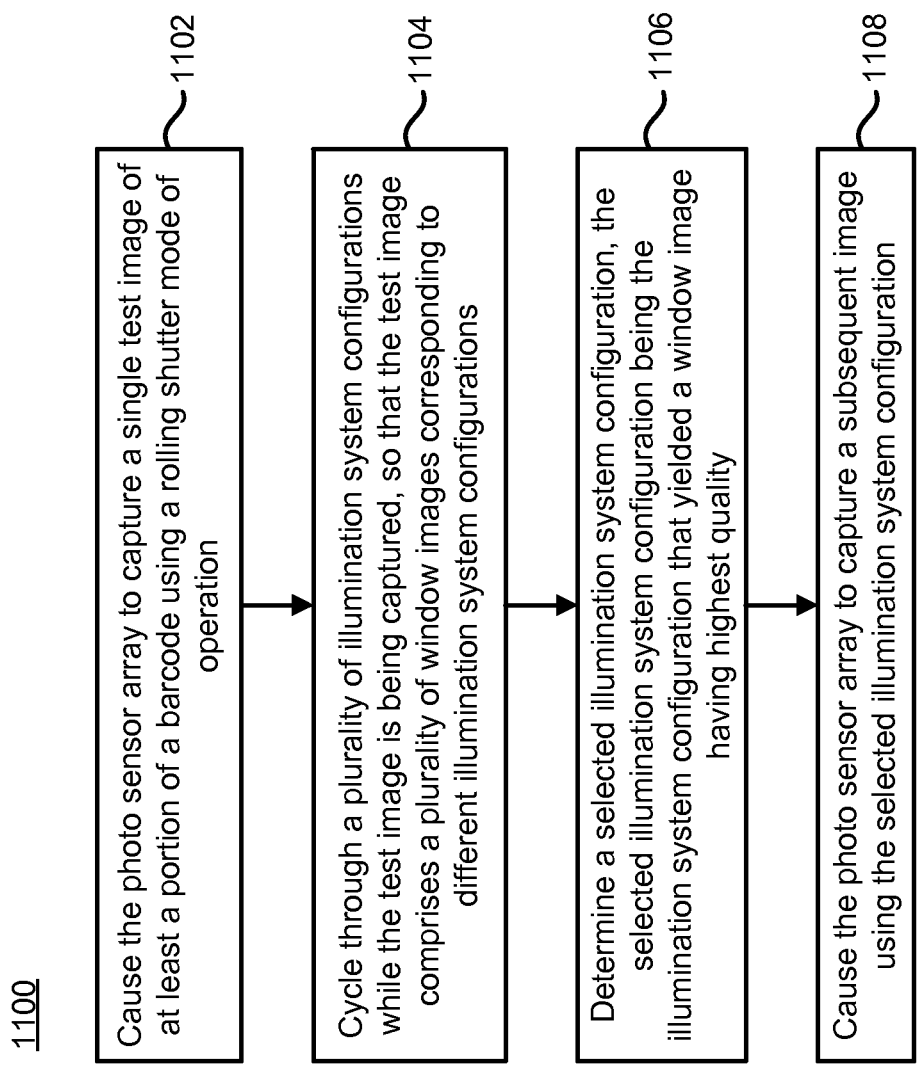
FIG. 11 illustrates another example of a method that may be performed by the illumination selection circuitry in accordance with the present disclosure.

FIG. 11 illustrates another example of a method 1100 that may be performed by the illumination selection circuitry 908 in accordance with the present disclosure. The circuitry 908 may be configured to cause the photo sensor array 904 to capture 1102 a single test image 1210 (shown in FIG. 12) of at least a portion of a barcode using a rolling shutter mode of operation. Windowing may be utilized, so that the test image 1210 may be smaller than a full photo sensor array image.

The circuitry 908 may be configured to cycle through 1104 a plurality of configurations of the plurality of illumination systems 906*a-b* while the test image 1210 is being captured, so that each illumination system configuration is activated for a distinct time period while the test image 1210 is being captured and is not otherwise activated while the test image 1210 is being captured. Consequently, the test image 1210 may include a plurality of window images 1212*a-b*. Each window image 1212 may correspond to a distinct band (e.g., a horizontal band) within the test image 1210, and each window image 1212 may correspond to a distinct illumination system configuration.

For example, during exposure of a first section 1214*a* of the photo sensor array 904, the bright field illumination system 906*a* may be activated, while the dark field illumination system 906*b* may be deactivated. During exposure of a second section 1214*b* of the photo sensor array 904, the dark field illumination system 906*b* may be activated, while the bright field illumination system 906*a* may be deactivated. (Both the bright field illumination system 906*a* and the dark field illumination system 906*b* may be activated during exposure of the section of the photo sensor array 904 between the first section 1214*a* and the second section 1214*b*, as the transition is made from one system to the other.)

In this example, the test image 1210 that is captured includes two distinct bands. The band corresponding to the first section 1214a of the photo sensor array 904 is captured using illumination solely from the bright field illumination system 906a. Thus, this window image 1212a may indicate the suitability of the bright field illumination system 906a for capturing an image of a barcode. The band corresponding to the second section 1214b of the photo sensor array 904 is captured using illumination solely from the dark field illumination system 906b. Thus, this window image 1212b may indicate the suitability of the dark field illumination system 906b for capturing a barcode.

In the example just described, there is one window image 1212 for each illumination system 906. However, under some circumstances multiple window images may be captured for one or more of the illumination systems 906. For example, during exposure of a first section of the photo sensor array 904, the bright field illumination system 906a may be activated, while the dark field illumination system 906b may be deactivated. During exposure of a second section of the photo sensor array 904, the dark field illumination system 906b may be activated, while the bright field illumination system 906a may be deactivated. During exposure of a third section of the photo sensor array 904, the bright field illumination system 906a may be activated at reduced power (e.g., 50%), while the dark field illumination system 906b may be deactivated. The test image in this example may include three window images corresponding to three distinct bands within the test image. The first window image may indicate the suitability of the bright field illumination system 906a for capturing an image of a barcode. The second window image may indicate the suitability of the dark field illumination system 906b for capturing an image of a barcode. The third window image may indicate the suitability of the bright field illumination system 906a, operating at reduced power, for capturing an image of a barcode.

Alternatively, both illumination systems 906a-b may be activated at the same time with various permutations of balanced intensity. For example, the band corresponding to the first section 1214a of the photo sensor array 904 may be captured using illumination from the bright field illumination system 906a powered at 60% and the dark field illumination system 906b powered at 40%. The band corresponding to the second section 1214b of the photo sensor array 904 may be captured using illumination from the bright field illumination system 906a powered at 40% and the dark field illumination system 906b powered at 60%.

Figure 12:
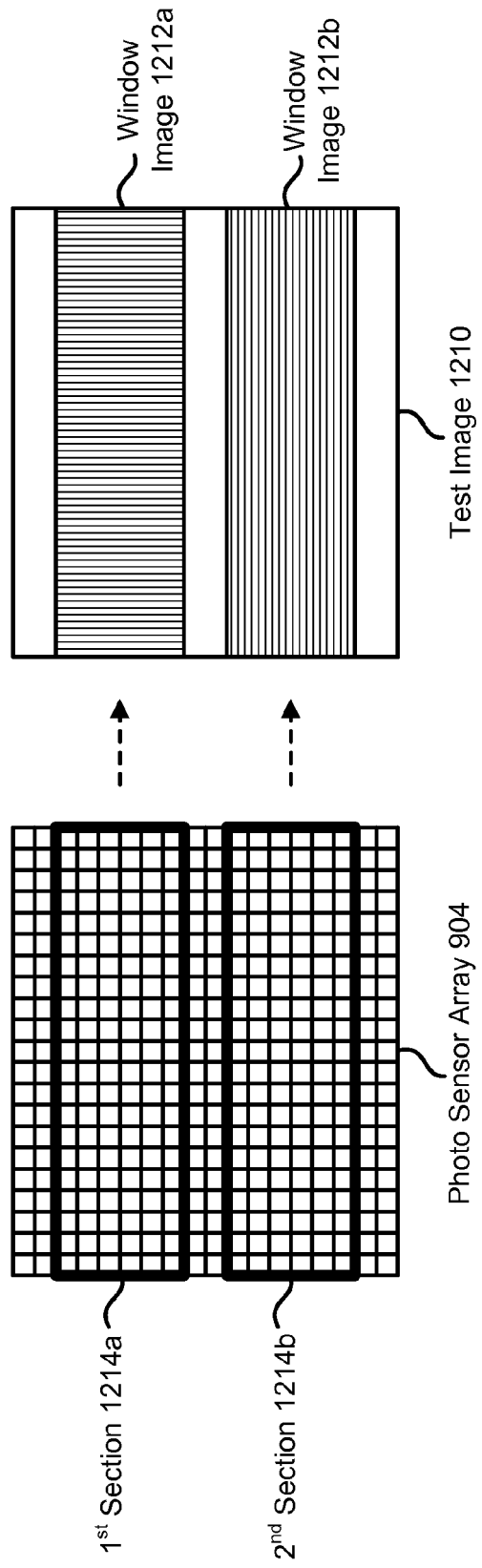
FIG. 12 illustrates one example of a single test image comprising a plurality of window images.
Figure 12A:
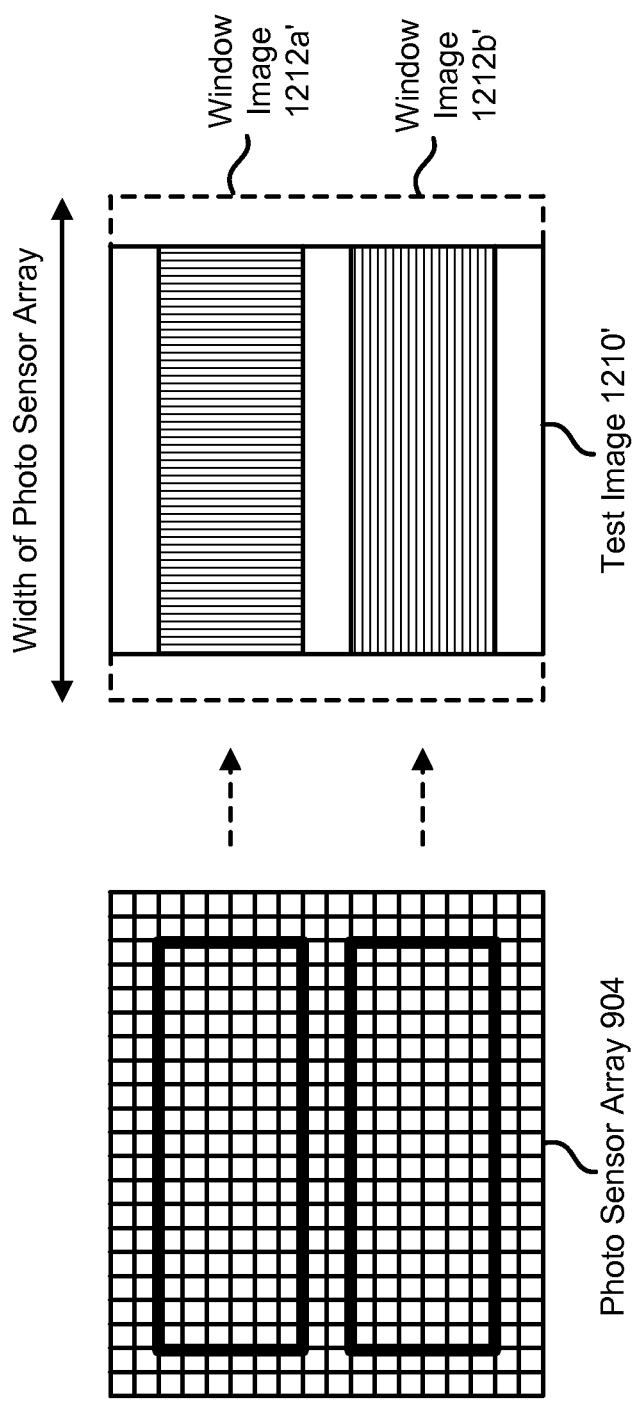
FIG. 12A illustrates another example of a single test image comprising a plurality of window images.

In FIG. 12, the width of the test image 1210 and the width of the window images 1212a, 1212b within the test image 1210 are shown as being equal to the width of the photo sensor array 904. As shown in FIG. 12A, however, the width of the test image 1210' and the width of the window images 1212a', 1212b' within the test image 1210' may alternatively be less than the width of the photo sensor array 904.

Returning to FIG. 11, the circuitry 908 may also be configured to determine 1106 a selected configuration of the plurality of illumination systems 906a-b. The selected illumination system configuration may be the configuration of the plurality of illumination systems 906a-b that yielded a window image 1212 having highest quality among the plurality of window images 1212a-b. The circuitry 908 may also be configured to cause the photo sensor array 904 to capture 1108 a subsequent image using the selected illumination system configuration.

Figure 13:
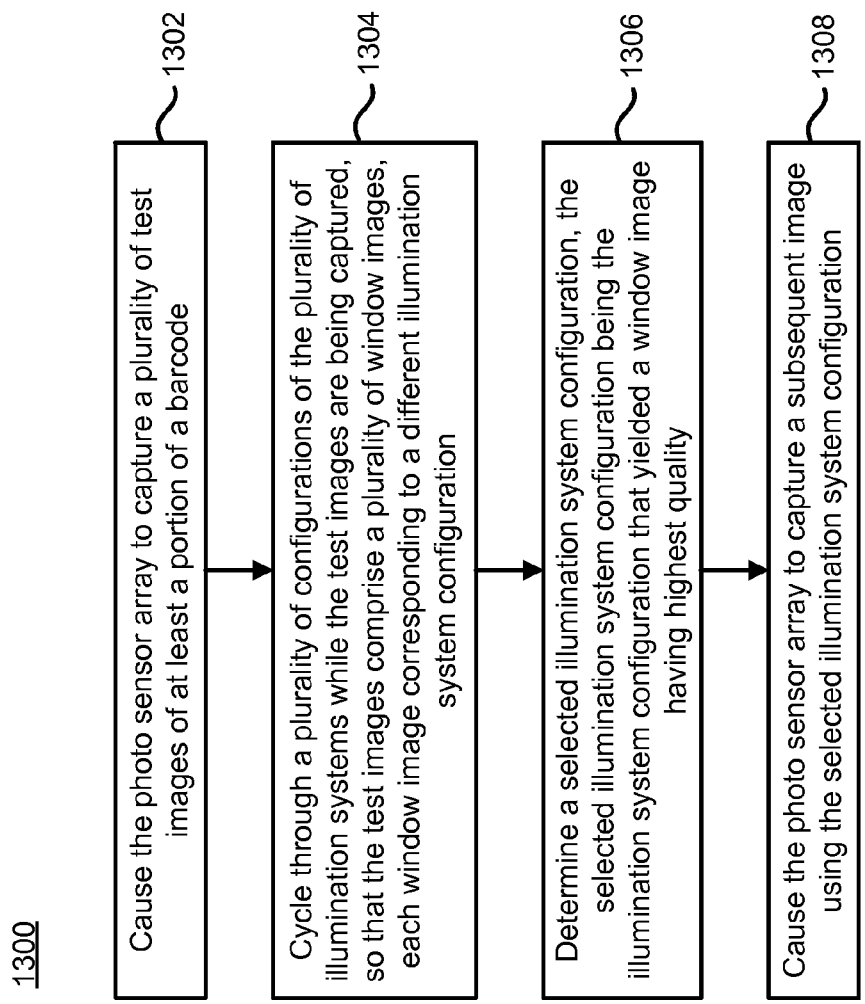
FIG. 13 illustrates another example of a method that may be performed by the illumination selection circuitry in accordance with the present disclosure.

FIG. 13 illustrates another example of a method 1300 that may be performed by the illumination selection circuitry 908 in accordance with the present disclosure. The circuitry 908 may be configured to cause the photo sensor array 904 to capture 1302 a plurality of test images 1410a-b (shown in FIGS. 14A-6B) of at least a portion of a barcode. The plurality of test images 1410a-b may be captured 1302 using a rolling shutter mode of operation or using a global shutter mode of operation. As shown in FIG. 14A, the plurality of test images 1410a-b may correspond to different sections of the photo sensor array 904. In other words, a first section of the photo sensor array 904 may be exposed and read out in order to capture the first test image 1410a, and a second section of the photo sensor array 904 may be exposed and read out in order to capture the second test image 1410b. Alternatively, as shown in FIG. 14B, the plurality of test images 1410a-b may correspond to the same section of the photo sensor array 904. In other words, the same section of the photo sensor array 904 may be exposed and read out in order to capture both test images 1410a-b.

The circuitry 908 may be configured to cycle through 1304 a plurality of configurations of the plurality of illumination systems 906a-b while the plurality of test images 1410a-b are being captured, so that each illumination system configuration is used as the sole source of illumination for at least one test image 1410. Each test image 1410 may therefore be considered to be a window image 1412 corresponding to a particular illumination system configuration. In other words, the plurality of test images 1410a-b may comprise a plurality of window images 1412a-b. Each window image 1412 may correspond to a different one of the plurality of test images 1410a-b. Each window image 1412 may also correspond to a different one of the plurality of illumination system configurations.

For example, a first test image 1410a and a second test image 1410b may be captured. The bright field illumination system 906a may be activated and the dark field illumination system 906b may be deactivated while the first test image 1410a is being captured. Conversely, the dark field illumination system 906b may be activated and the bright field illumination system 906a may be deactivated while the second test image 1410b is being captured. The first test image 1410a may be considered to be a window image 1412a corresponding to the bright field illumination system 906a. The second test image 1410b may be considered to be a window image 1412b corresponding to the dark field illumination system 906b.

Alternatively, the bright field illumination system 906a may be activated at 60% power and the dark field illumination system 906b may be activated at 40% power while the first test image 1410a is being captured. The bright field illumination system 906a may be activated at 40% power and the dark field illumination system 906b may be activated at 60% power while the second test image 1410b is being captured.

Returning to FIG. 13, the circuitry 908 may also be configured to determine 1306 a selected illumination system configuration. The selected illumination system configuration may be the configuration of the plurality of illumination systems 906a-b that yielded a window image 1412 having highest quality among the plurality of window images 1412a-b. The circuitry 908 may also be configured to cause the photo sensor array 904 to capture 1308 a subsequent image using the selected illumination system configuration.

In the examples that are shown in FIGS. 14A and 14B, the width of the test images 1410a-b and window images 1412a-b are equal to the width of the photo sensor array 904. Alternatively, however, the width of the test images and window images may be less than the width of the photo sensor array 904.

Figure 15:
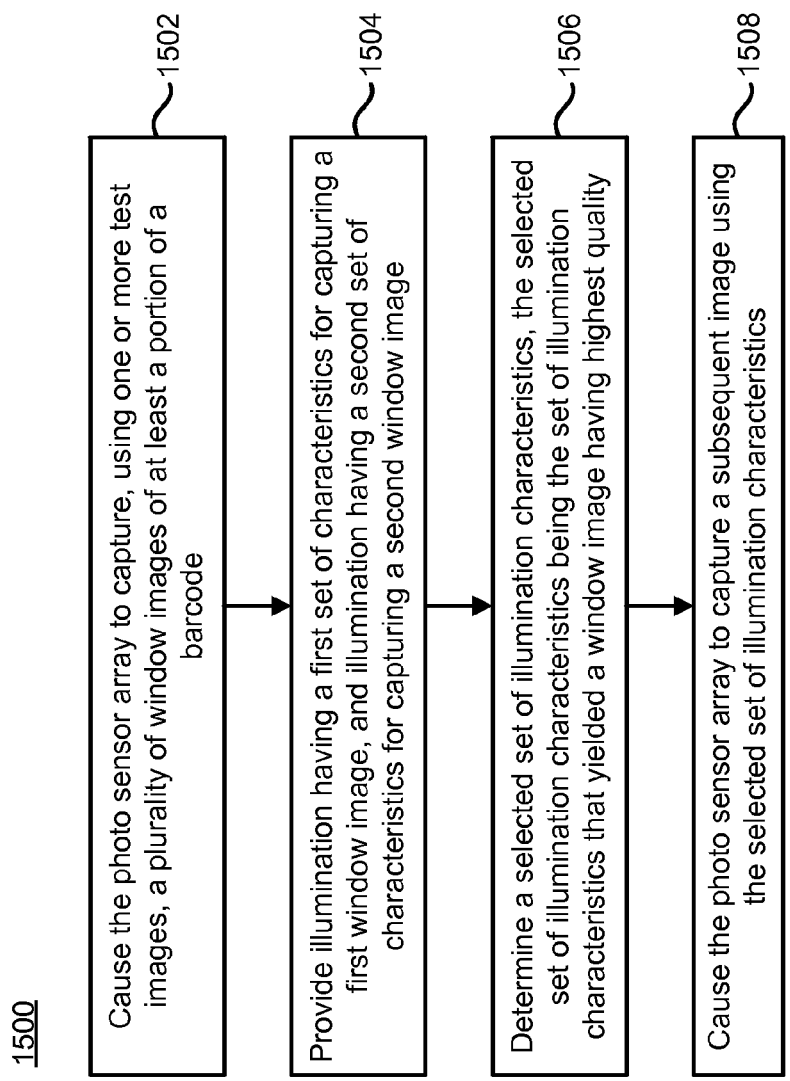
FIG. 15 illustrates another example of a method that may be performed by the illumination selection circuitry in accordance with the present disclosure.

FIG. 15 illustrates another example of a method 1500 that may be performed by the illumination selection circuitry 908 in accordance with the present disclosure. The illumination selection circuitry 908 may be configured to cause the photo sensor array 904 to capture 1502, using one or more test images, a plurality of window images of at least a portion of a barcode.

The plurality of window images may include a first window image and a second window image. The illumination selection circuitry 908 may be configured to provide 1504 illumination having a first set of illumination characteristics for capturing the first window image and illumination having a second set of illumination characteristics (different than the first set of illumination characteristics) for capturing the second window image. In this context, a "set of illumination characteristics" may include multiple illumination characteristics, or only a single illumination characteristic. Some examples of different illumination characteristics were described above.

Different illumination systems 906a-b may be utilized to provide illumination having different illumination characteristics. Alternatively, a single illumination system 906 may be utilized, but the illumination system may be capable of providing illumination having different illumination characteristics.

The illumination selection circuitry 908 may also be configured to determine 1606 a selected set of illumination characteristics. The selected set of illumination characteristics may be the set of illumination characteristics that yielded a window image having highest quality among the plurality of window images.

As indicated above, the quality of a window image may be measured in terms of image contrast. Therefore, determining 1506 the selected set of illumination characteristics may include determining which window image of the plurality of window images has highest contrast between light and dark cells of the barcode, and determining which set of illumination characteristics was utilized when the window image having the highest contrast was captured.

Alternatively, as indicated above, the quality of a window image may be measured in terms of the presence of desired barcode features and/or patterns. Therefore, determining 1506 the selected set of illumination characteristics may include determining which window image of the plurality of window images has the most favorable score/metric based on features or patterns of the barcode, and determining which set of illumination characteristics was utilized when the window image having the most favorable score/metric was captured.

The illumination selection circuitry 908 may also be configured to cause the photo sensor array 904 to capture 1508 a subsequent image using the selected set of illumination characteristics. The subsequent image may be captured using a global shutter or a rolling shutter mode of operation. As indicated above, the test image(s) may include only a portion of a barcode. However, the subsequent image may include an entire barcode.

Figure 16:
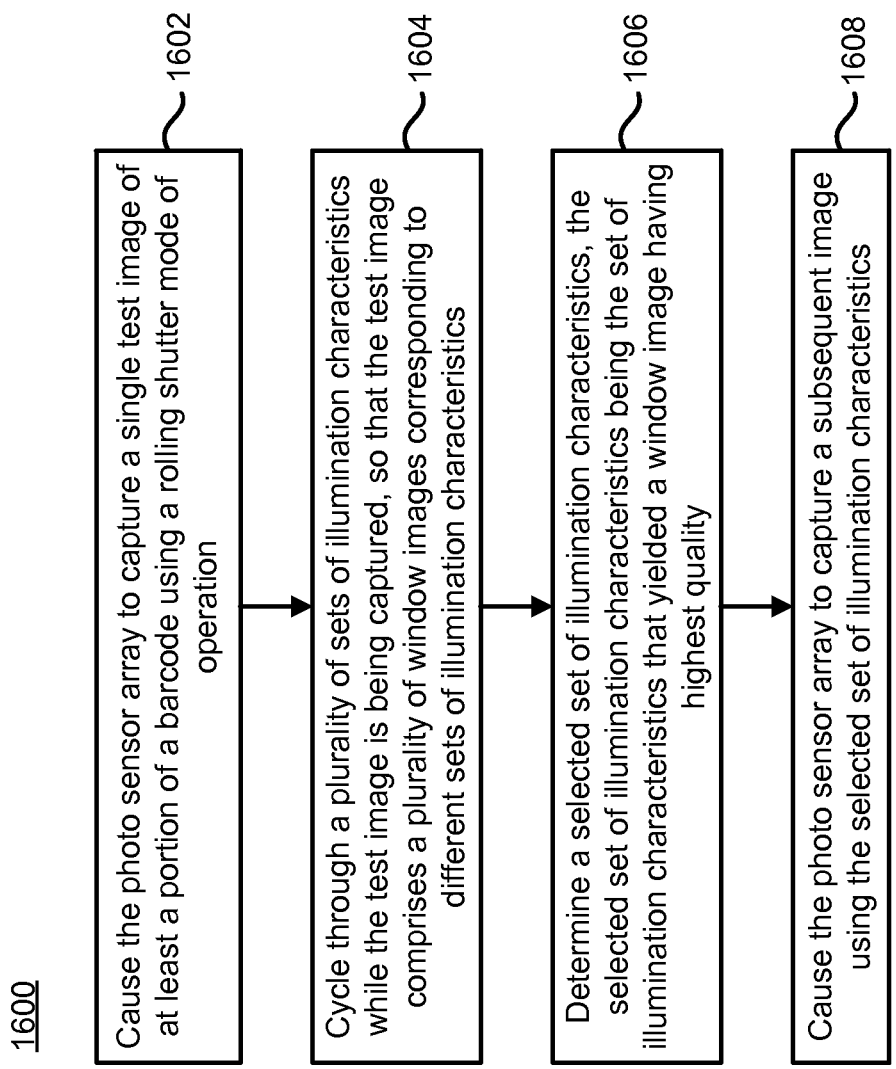
FIG. 16 illustrates another example of a method that may be performed by the illumination selection circuitry in accordance with the present disclosure.

FIG. 16 illustrates another example of a method 1600 that may be performed by the illumination selection circuitry 908 in accordance with the present disclosure. The illumination selection circuitry 908 may be configured to cause the photo sensor array 904 to capture 1602 a single test image 1210 of at least a portion of a barcode using a rolling shutter mode of operation. Windowing may be utilized, so that the test image 1210 may be smaller than a full photo sensor array image.

The circuitry 908 may be configured to cycle 1604 through a plurality of sets of illumination characteristics while the test image 1210 is being captured, so that each set of illumination characteristics is utilized for a distinct time period while the single test image 1210 is being captured and is not otherwise utilized while the single test image 1210 is being captured. Consequently, the test image 1210 may include a plurality of window images 1212a-b, where each window image 1212 corresponds to a distinct band within the test image 1210, and where each window image 1212 corresponds to a distinct one of the plurality of sets of illumination characteristics.

For example, during exposure of a first section 1214a of the photo sensor array 904, a first set of illumination characteristics (e.g., direct, high intensity illumination) may be utilized. The window image 1212a may correspond to this first set of illumination characteristics. During exposure of a second section 1214b of the photo sensor array 904, a second set of illumination characteristics (e.g., angled, low intensity, diffuse illumination) may be utilized. The window image 1212b may correspond to this second set of illumination characteristics.

Alternatively, during exposure of the first section 1214a of the photo sensor array 904, both the bright field illumination system 906a and the dark field illumination system 906b may be activated, with the bright field illumination system 906a powered at 60% and the dark field illumination system 906b powered at 40%. During exposure of the second section 1214b of the photo sensor array 904, both the bright field illumination system 906a and the dark field illumination system 906b may be activated, with the bright field illumination system 906a powered at 40% and the dark field illumination system 906b powered at 60%.

The circuitry 908 may also be configured to determine 1606 a selected set of illumination characteristics. The selected set of illumination characteristics may be the set of illumination characteristics that yielded a window image 1212 having highest quality among the plurality of window images 1212a-b. The circuitry 908 may also be configured to cause the photo sensor array 904 to capture 1608 a subsequent image using the selected set of illumination characteristics.

Figure 17:
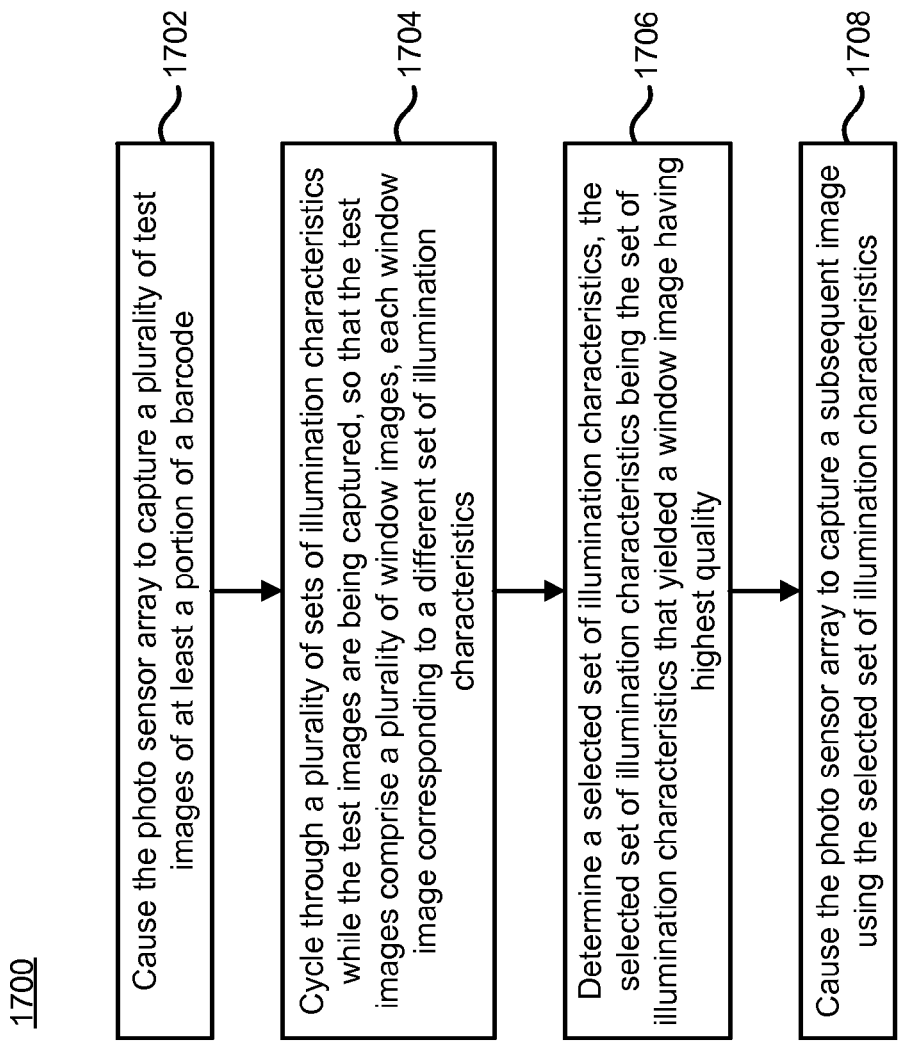
FIG. 17 illustrates another example of a method that may be performed by the illumination selection circuitry in accordance with the present disclosure.

FIG. 17 illustrates another example of a method 1700 that may be performed by the illumination selection circuitry 908 in accordance with the present disclosure. The circuitry 908 may be configured to cause the photo sensor array 904 to capture 1702 a plurality of test images 1410a-b of at least a portion of a barcode. The plurality of test images 1410a-b may be captured using a rolling shutter mode of operation or using a global shutter mode of operation. The plurality of test images may correspond to different sections of the photo sensor array 904 (as shown in FIG. 14A), or to the same section of the photo sensor array 904 (as shown in FIG. 14B).

The circuitry 908 may be configured to cycle 1704 through a plurality of sets of illumination characteristics while the plurality of test images 1410a-b are being captured, so that each set of illumination characteristics is used as the sole source of illumination for at least one test image 1410. Each test image 1410 may therefore be considered to be a window image 1412 corresponding to a particular set of illumination characteristics. In other words, the plurality of test images 1410a-b may include a plurality of window images 1412a-b, where each window image 1412 may correspond to a different one of the plurality of test images 1410a-b, and where each window image 1412 may correspond to a different one of the plurality of sets of illumination characteristics.

The circuitry 908 may also be configured to determine 1706 a selected set of illumination characteristics. The selected set of illumination characteristics may be the set of illumination characteristics that yielded a window image having highest quality among the plurality of window images. The circuitry 908 may also be configured to cause the photo sensor array 904 to capture 1708 a subsequent image using the selected set of illumination characteristics.

Figure 18:
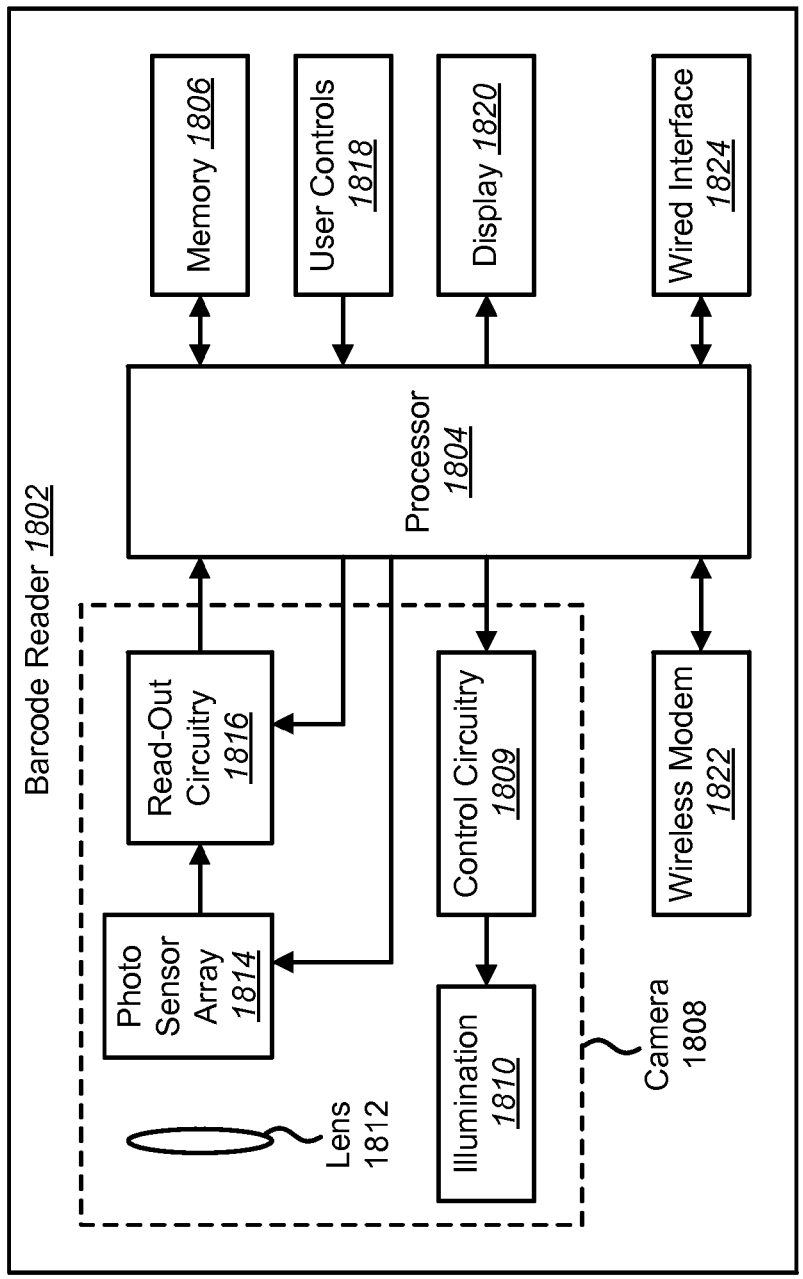
FIG. 18 illustrates various components that may be utilized in a barcode reader.

FIG. 18 illustrates various components that may be utilized in a barcode reader 1802. Any of the barcode readers 100, 700, 800, 902 described previously may include some or all of the components of the barcode reader 1802.

The barcode reader 1802 includes a processor 1804. The processor 1804 may be a general purpose single- or multi-chip microprocessor (e.g., an ARM), a special purpose microprocessor (e.g., a digital signal processor (DSP)), a microcontroller, a programmable gate array, etc. The processor 1804 may be referred to as a central processing unit (CPU). Although just a single processor 1804 is shown in the barcode reader 1802 of FIG. 18, in an alternative configuration, a combination of processors (e.g., an ARM and DSP) could be used.

The barcode reader 1802 also includes memory 1806 in electronic communication with the processor 1804. That is, the processor 1804 can read information from and/or write information to the memory 1806. The memory 1806 may be any electronic component capable of storing electronic information. The memory 1806 may be random access memory (RAM), read-only memory (ROM), magnetic disk storage media, optical storage media, flash memory devices in RAM, on-board memory included with the processor 1804, programmable read-only memory (PROM), erasable programmable read-only memory (EPROM), electrically erasable PROM (EEPROM), registers, and so forth, including combinations thereof.

Data and instructions may be stored in the memory 1806. The instructions may include one or more programs, routines, sub-routines, functions, procedures, etc. The instructions may include a single computer-readable statement or many computer-readable statements. The instructions may be executable by the processor 1804 to implement one or more of the methods, operations, functions and/or procedures described above. Executing the instructions may involve the use of the data that is stored in the memory 1806.

The barcode reader 1802 may include several components that may collectively be referred to as a camera 1808. Illumination components 1810 within the camera 1808 may be activated by control circuitry 1809 so as to illuminate a target area. The illumination components 1810 may be configured to provide illumination having different illumination characteristics (e.g., by changing the intensity, wavelength, angle, and/or diffusion characteristics of the illumination), as described previously. The illumination components 1810 may be included in a plurality of different illumination systems having different illumination characteristics (e.g., a bright field illumination system, a diffuse bright field illumination system, and a dark field illumination system). Alternatively, the illumination components 1810 may be included within a single illumination system that is configured to provide illumination having different illumination characteristics. The illumination components 1810 may include light-emitting diodes (LEDs) and appropriate control circuitry. One or more lenses 1812 within the camera 1808 may focus light reflected from item(s) within the target area (e.g., a barcode) onto a photo sensor array 1814. The photo sensor array 1814 may be a solid-state photo-detecting device containing a relatively large number of light-sensitive pixels that are arranged in horizontal rows and vertical columns. Read-out circuitry 1816 may electronically read the pixels within the photo sensor array 1814 in order to obtain a digital image.

The barcode reader 1802 may include one or more user controls 1818 that may be used to provide user input. Examples of different kinds of user controls 1818 include one or more buttons, a touchscreen, a keyboard (actual and/or virtual), a microphone, a trackball, a lightpen, etc.

The barcode reader 1802 may include a display 1820. The display 1820 may utilize any suitable image projection technology, such as a liquid crystal display (LCD), light-emitting diode (LED), gas plasma, electroluminescence, etc. The display 1820 may be a touchscreen. A display controller may also be provided, for converting data stored in the memory 1806 into text, graphics, and/or moving images (as appropriate) shown on the display 1820.

The barcode reader 1802 may include one or more communication interfaces for communicating with other electronic devices. For example, the barcode reader 1802 may include a wireless modem 1822 that allows the barcode reader 1802 to be connected to a wireless network. Alternatively, or in addition, the barcode reader 1802 may include a wired communication interface 1824 (e.g., a USB interface).

Another embodiment of the barcode readers discussed previously will now be described in relation to FIGS. 19-21. In this embodiment the camera assembly 103 (FIGS. 1 and 5, 6 and 7) includes a first lens assembly 1904a and a second lens assembly 1904b in place of the single lens 104 in the camera assembly 103.

In the following discussion, unless otherwise indicated, the term "field of view" may refer to the field of view of the first lens assembly 1904a, the second lens assembly 1904b, the image sensor 1902, and/or the barcode reader 1900.

Figure 19:
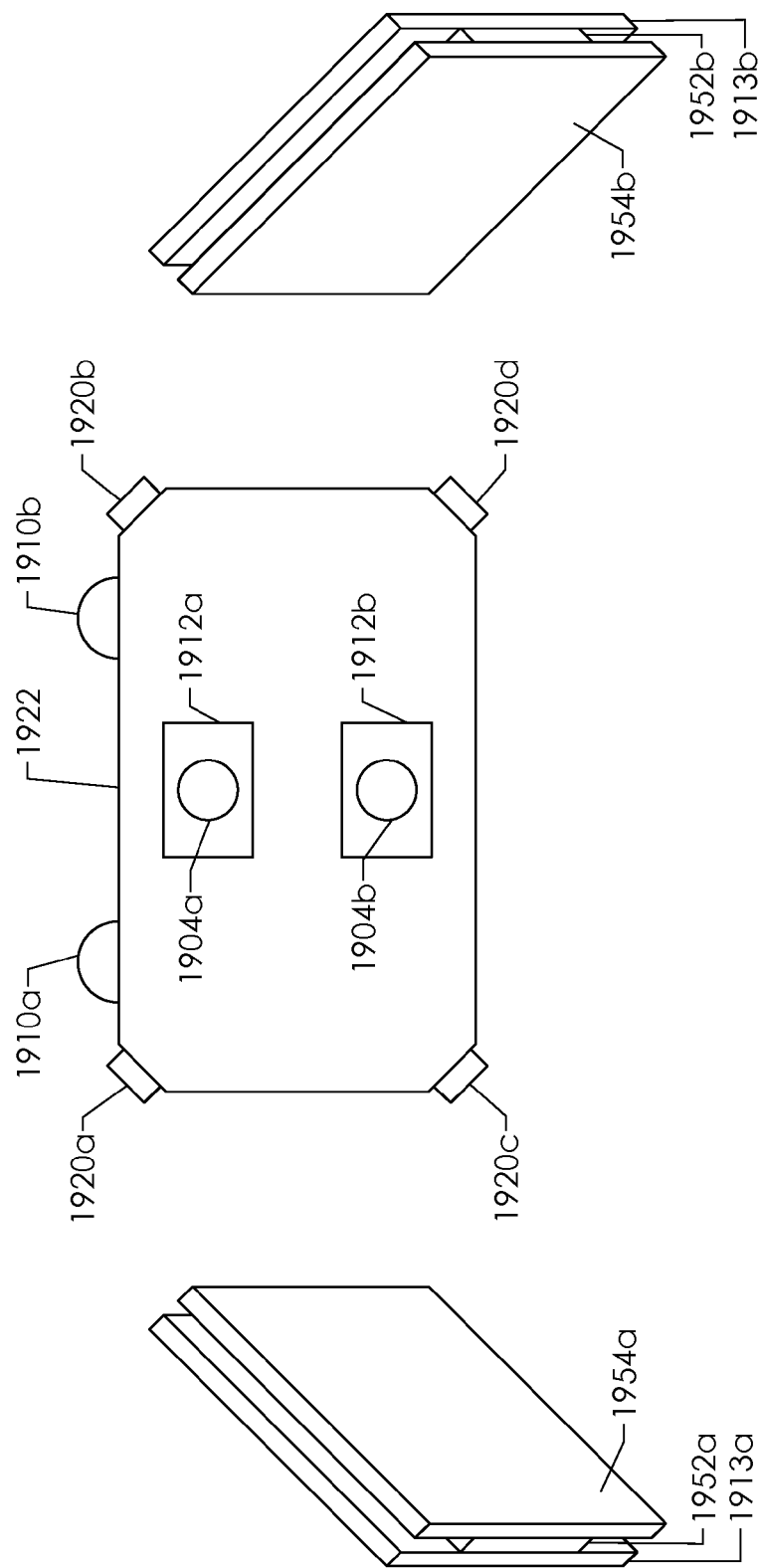
FIG. 19 illustrates a front view of a barcode reader in accordance with the present disclosure.

Reference is initially made to FIG. 19, which illustrates a front view of the barcode reader with this alternative embodiment camera assembly (referred to as barcode reader 1900). The barcode reader 1900 includes a dark field illumination system, a diffuse bright field illumination system and a bright field illumination system. (The bright field illumination system may alternatively be referred to as a direct bright field illumination system.) Each of these illumination systems directs illumination into the field of view. The illumination emitted by the dark field illumination system may be referred to herein as dark field illumination, and it may be similar to the dark field illumination systems described above in connection with FIGS. 1, 5, 6, 7, 8A, and 8B. The illumination emitted by the diffuse bright field illumination system may be referred to herein as diffuse bright field illumination, and it may be similar to the diffuse bright field illumination described above in connection with FIGS. 1, 2A, 2B, 2C, 2D, 2E, 3A, 3B, 3C, 3D, 3E, 3F, 4A, 4B, 4C, 5, 6, and 7. The illumination emitted by the bright field illumination system may be referred to herein as bright field illumination (and/or direct bright field illumination), and it may be similar to the bright field illumination 112 described above in connection FIGS. 1, 5, 6 and 7.

The dark field illumination system includes a first set of illumination sources 1952a positioned behind optics 1954a, and a second set of illumination sources 1952b positioned behind optics 1954b as described in FIG. 1, adjacent to the optics as described in FIG. 8A and/or behind the optics as described in FIG. 8B. The diffuse bright field illumination system includes an optical substrate 1922 and illumination sources 1920a-d in the manner described with respect to FIGS. 1 and 2A. Alternatively the diffuse bright field illumination system may be any of the embodiments described in FIGS. 1, 2A, 2B, 2C, 2D, 2E, 3A, 3B, 3C, 3D, 3E, 3F, 4A, 4B, 4C, 5, 6, and 7. The bright field illumination system includes illumination sources (not shown) positioned behind refracting diffusors 1910a-b in the manner described with respect to FIG. 1. Alternatively the bright field illumination system may be any of the embodiments described in FIGS. 1, 5, 6, and 7.

The optics 1954*a-b* may utilize refraction, diffusion, prismatic effect, and/or total internal reflection to direct the dark field illumination 156 into the field of view. If the optics 1954*a-b* utilize diffusion, and if the optics 1954*a-b* are positioned in front of the illumination sources 1952*a-b* (as shown in FIG. 19), then the optics 1954*a-b* may be referred to as back lit diffusors or back lit illumination diffusors. If the optics 1954*a-b* utilize both refraction and diffusion, then the optics 1954*a-b* may be referred to as refracting diffusors.

The dark field illumination 156 and the bright field illumination 112 may have a first illumination spectrum, and the diffuse bright field illumination 124 may have a second illumination spectrum that is different than the first illumination spectrum. More specifically, the illumination sources 1952*a-b* of the dark field illumination system and the illumination sources of the bright field illumination system may emit electromagnetic radiation within a first range of wavelengths, and the illumination sources 1920*a-d* of the diffuse bright field illumination system may emit electromagnetic radiation within a second range of wavelengths. Thus, the dark field illumination system and the bright field illumination system may each illuminate at least part of the field of view with a first illumination spectrum, and the diffuse bright field illumination system may illuminate at least part of the field of view with a second illumination spectrum. The second illumination spectrum may be broader than the first illumination spectrum. For example, the first illumination spectrum may include electromagnetic radiation primarily from 650 nm to 700 nm, and the second illumination spectrum may include electromagnetic radiation primarily from 400 nm to 700 nm.

In one embodiment, an illumination spectrum includes electromagnetic radiation primarily within a specified range if at least 90% of the electromagnetic radiation within the illumination spectrum is within the specified range. In another embodiment, an illumination spectrum includes electromagnetic radiation primarily within a specified range if at least 75% of the electromagnetic radiation within the illumination spectrum is within the specified range. In another embodiment, an illumination spectrum includes electromagnetic radiation primarily within a specified range if a majority (i.e., more than 50%) of the electromagnetic radiation within the illumination spectrum is within the specified range.

Figure 20:
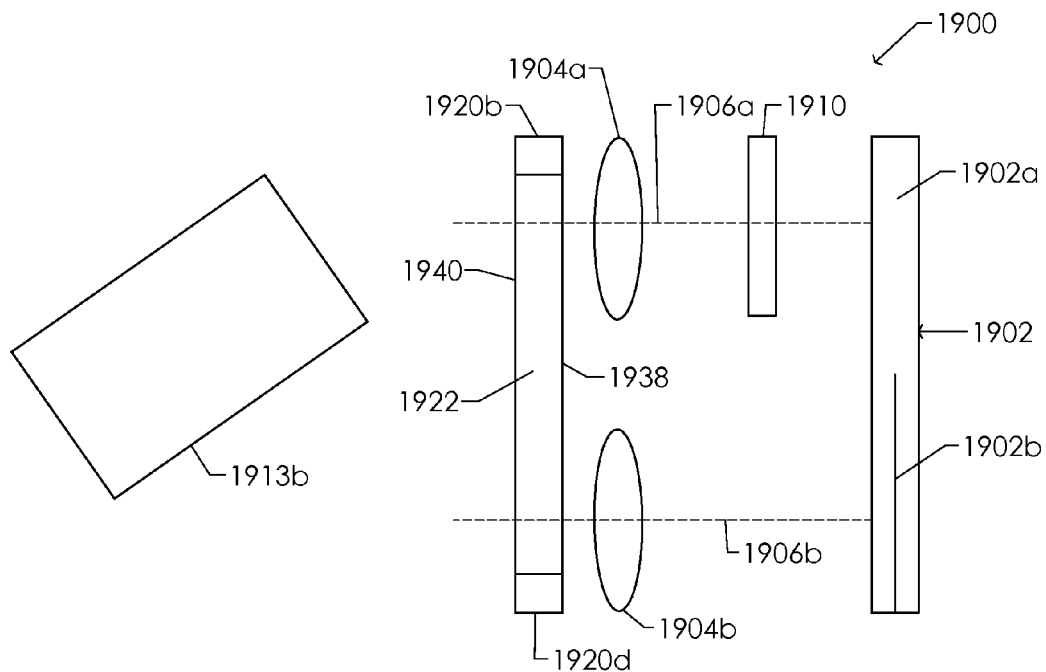
FIG. 20 illustrates a side view of the barcode reader shown in FIG. 19.

Reference is now made to FIG. 20, which illustrates a side view of the barcode reader 1900. As mentioned previously, the barcode reader 1900 includes a first lens assembly 1904*a* and a second lens assembly 1904*b* in place of the single lens 104 in the camera assembly 103. The lens assemblies 1904*a-b* may be focused to the same focal length.

In the depicted embodiment, the first and second lens assemblies 1904*a-b* each include a single optical lens. However, as used herein, the term "lens assembly" refers to a set of one or more optical lenses. Thus, in an alternative embodiment, the first lens assembly 1904*a* and/or the second lens assembly 1904*b* could include multiple optical lenses.

The barcode reader 1900 includes an image sensor 1902, which is configured to capture an image of an object (e.g., a barcode) that is positioned within the field of view. The lens assemblies 1904*a-b* each provide a corresponding image of the object (e.g., the barcode) on the image sensor 1902. There is a first optical path 1906*a* from the field of view through the first lens assembly 1904*a* to a first section (or portion) 1902*a* of the image sensor 1902. There is a second optical path 1906*b* (which is different from the first optical path 1906*a*) from the field of view through the second lens assembly 1904*b* to a second section (or portion) 1902*b* of the image sensor 1902. The first and second optical paths 1906*a-b* are substantially parallel to one another. The first lens assembly 1904*a* provides a first image of the object on the first section/portion 1902*a* of the image sensor 1902, and the second lens assembly 1904*b* provides a second image of the object on the second section/portion 1902*b* of the image sensor 1902.

Stated another way, the first lens assembly 1904*a* has a first field of view and a first optical path 1906*a* for illumination from the first field of view to project to a first section/portion 1902*a* of the image sensor 1902. The second lens assembly 1904*b* has a second field of view and a second optical path 1906*b* for illumination from the second field of view to project to a second section/portion 1902*b* of the image sensor 1902.

Figure 21:
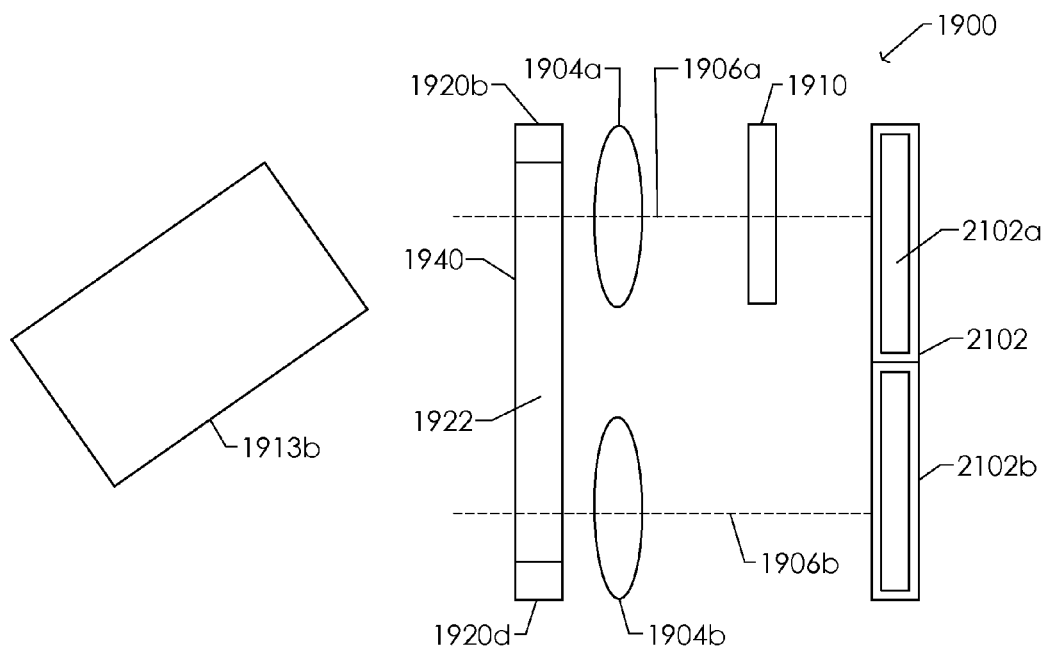
FIG. 21 illustrates a side view of an alternative embodiment of the barcode reader shown in FIG. 19.

Alternatively, as shown in FIG. 21, the barcode reader 1900 may include a first image sensor 2102*a* and a second image sensor 2102*b*, which may collectively be referred to as an image sensor 2102. The first image sensor 2102*a* may be considered to be a first section (or portion) of the image sensor 2102, and the second image sensor 2102*b* may be considered to be a second section (or portion) of the image sensor 2102. The first optical path 1906*a* may extend from the field of view through the first lens assembly 1904*a* to the first image sensor 2102*a*. The second optical path 1906*b* may extend from the field of view through the second lens assembly 1904*b* to the second image sensor 2102*b*.

Referring again to FIG. 19, the center of the optical substrate 1922 includes two openings 1912*a-b* through which an object (e.g., a barcode) within the field of view may be visible to the lens assemblies 1904*a-b* and the image sensor 1902. As shown in FIG. 19, the illumination sources 1952*b* are positioned to the right side (when facing the barcode reader 1900) of the lens assemblies 1906*a-b*. The illumination sources 1952*a* are positioned to the left side of the lens assemblies 1904*a-b*.

The barcode reader 1900 includes control circuitry, which may be similar to the control circuitry 1809 discussed above in relation to the barcode reader 1802 shown in FIG. 18. The control circuitry 1809 may independently control the intensity of the illumination sources 1952*a-b*. More specifically, the control circuitry 1809 may be able to adjust the intensity of the illumination sources 1952*a* without affecting the intensity of the illumination sources 1952*b*, and vice versa.

Referring again to FIG. 20, the first optical path 1906*a* includes a filter 1910. The filter 1910 is configured to pass a spectrum of electromagnetic radiation that may be referred to herein as an acceptance spectrum of electromagnetic radiation. In addition, the filter 1910 is configured to attenuate a spectrum of electromagnetic radiation that may be referred to herein as an attenuated spectrum of electromagnetic radiation.

As indicated above, the dark field illumination 156 may have a first illumination spectrum. The first illumination spectrum may include the acceptance spectrum. In some embodiments, the first illumination spectrum may primarily be composed of the acceptance spectrum. In one embodiment, the first illumination spectrum may be identical or substantially identical (e.g., at least 90% identical) to the acceptance spectrum. In another embodiment, there may be at least a 80% overlap between the first illumination spectrum and the acceptance spectrum. In another embodiment, there may be at least a 60% overlap between the first illumination spectrum and the acceptance spectrum. The attenuated spectrum may include frequencies of visible light that are not included in the first illumination spectrum.

The first lens assembly 1904*a* and the filter 1910 may collectively be referred to as a first set of imaging optics. The second lens assembly 1904*b* may be referred to as a second set of imaging optics. The first set of imaging optics may provide a first image of an object (e.g., a barcode) on the image sensor 1902. The second set of imaging optics may provide a second image of the object on the image sensor 1902. Because the first set of imaging optics includes a filter 1910 and the second set of imaging optics does not, the first set of imaging optics and the second set of imaging optics respond differently to the different illumination spectrums of the dark field illumination system, the diffuse bright field illumination system and the bright field illumination system.

More specifically, the first set of imaging optics (including the first lens assembly 1904a and the filter 1910) may be configured so that it focuses an image of an object (e.g., a barcode) within the field of view with a superior contrast profile when the object is illuminated by the dark field illumination system and/or the bright field illumination system as compared to when the object is illuminated by the diffuse bright field illumination system.

Conversely, the second set of imaging optics (including the second lens assembly 1904b) may be configured so that it focuses an image of an object (e.g., a barcode) within the field of view with a superior contrast profile when the object is illuminated by the diffuse bright field illumination system as compared to when the object is illuminated by the dark field illumination system and/or the bright field illumination system.

As used herein, the phrase "superior contrast profile" means at least one of: (i) greater maximum amplitude between the portions of the image that are dark marks of the barcode and the portions of the image that are light marks of the barcode; and (ii) more distinct transitions between portions of the image that are dark marks of the barcode and the portions of the image that are light marks of the barcode.

Having different sets of imaging optics that respond differently to the different illumination spectrums of the dark field illumination system, the diffuse bright field illumination system and the bright field illumination system may enable the barcode reader 1900 to be used for reading barcodes that are printed (or otherwise created) using diverse technologies, including direct part marking.

The combination of the dark field illumination 156 and/or the bright field illumination 112 and the first set of imaging optics may be optimal (compared to other possible combinations of illumination and optics) for reading certain types of barcodes. For example, if the spectrum of the dark field illumination 156 and/or the bright field illumination 112 is substantially from 650-700 nm, and the acceptance spectrum of the filter 910 is primarily from 650-700 nm, the combination of the dark field illumination 156 and/or the bright field illumination 112 and the first set of imaging optics may be optimal for reading barcodes formed via copper marking on a red or green background. More specifically, in a captured image of a barcode formed via copper marking on a red background, this combination may cause the background to appear white and the barcode to appear dark. In a captured image of a barcode formed via copper marking on a green background, this combination may cause the background to appear dark and the barcode to appear white.

Conversely, the combination of the diffuse bright field illumination 124 and the second set of imaging optics may be optimal (compared to other possible combinations of illumination and optics) for reading other types of barcodes. For example, because the second set of imaging optics does not include a filter 1910, the second set of imaging optics may be preferable for reading barcodes of a certain color (e.g., red). As another example, the combination of the diffuse bright field illumination 124 and the second set of imaging optics may be optimal for reading barcodes that include dark ink on a green printed circuit board. In a captured image of such a barcode, this combination may cause the barcode to appear dark against a light background.

The filter 1910 in the first set of imaging optics may increase contrast between the portions of the image that are dark marks of the barcode and the portions of the image that are light marks of the barcode. The filter 1910 may also eliminate ambient noise. Therefore, the image that the first set of imaging optics projects onto the first section/portion 1902a of the image sensor 1902 may not have distortions caused by ambient illumination. Conversely, the image that the second set of imaging optics projects onto the second section/portion 1902b of the image sensor 1902 may include distortions caused by ambient illumination.

The barcode reader 1900 may include a housing that is similar to the housing 101 of the barcode reader 100 shown in FIG. 1. The first set of imaging optics and the second set of imaging optics may be positioned within the housing 101 such that the first optical path 1906a passes through the first set of imaging optics (including the first lens assembly 1904a and the filter 1910) to the first section (or portion) 1902a of the image sensor 1902, and the second optical path 1906b passes through the second set of imaging optics (including the second lens assembly 1904b) to the second section (or portion) 1902b of the image sensor 1902. The illumination sources 1952b of the dark field illumination system are positioned to the right side of the first and second sets of imaging optics, and the illumination sources 1952a of the dark field illumination system are positioned to the left side of the first and second sets of imaging optics.

The first section/portion 1902a of the image sensor 1902 may correspond to approximately a first half of the image sensor 1902, and the second section/portion 1902b of the image sensor 1902 may correspond to approximately a second half of the image sensor 1902. In one embodiment, the phrase "approximately . . . half of the image sensor 1902" refers to 45-55% of the image sensor 1902. In another embodiment, the phrase "approximately . . . half of the image sensor 1902" refers to 40-60% of the image sensor 1902.

The illumination sources 1952a-b and optics 1954a-b may be positioned similarly to the illumination sources 152a-b and optics 154a-b in the barcode reader 100 shown in FIG. 1. Thus, the angle and direction at which the dark field illumination system of the barcode reader 1900 emits the dark field illumination 156 may be similar to the angle and direction at which the dark field illumination system of the barcode reader 100 emits the dark field illumination 156. Accordingly, the dark field illumination system of the barcode reader 1900 may emit dark field illumination 156 towards the first optical path 1906a at an angle (which may be referred to herein as an emission angle) that is less than 45 degrees from a plane that is perpendicular to the first optical path 1906a.

Stated another way, the dark field illumination system of the barcode reader 1900 may emit dark field illumination 156 into the field of view at an angle that is less than 45 degrees from a plane that is perpendicular to an optical path 1906a, where the optical path 1906a extends from the image sensor 1902 through the first set of imaging optics (including the first lens assembly 1904a and the filter 1910) into the center of the field of view of the first set of imaging optics.

In some embodiments, the optics 1954a-b may comprise back lit illumination diffusors that project dark field illumination 156 into the field of view at an angle that is less than 45 degrees from a plane that is perpendicular to the first optical path 1906a.

The illumination sources 1920*a-d* and the optical substrate 1922 may be positioned similarly to the illumination sources 120*a-d* and the optical substrate 122 in the barcode reader 100 shown in FIG. 1. Thus, the angle and direction at which the diffuse bright field illumination system of the barcode reader 1900 emits the diffuse bright field illumination 124 may be similar to the angle and direction at which the diffuse bright field illumination system of the barcode reader 100 emits the diffuse bright field illumination 124. Accordingly, the diffuse bright field illumination system of the barcode reader 1900 may emit diffuse bright field illumination 124 substantially parallel to the optical paths 1906*a-b*.

The illumination sources and diffusors 1910*a-b* of the bright field illumination system may be positioned similarly to the illumination sources 108*a-b* and diffusors 110*a-b* in the barcode reader 100 shown in FIG. 1. Thus, the angle and direction at which the bright field illumination system of the barcode reader 1900 emits the bright field illumination 112 may be similar to the angle and direction at which the bright field illumination system of the barcode reader 100 emits the bright field illumination 112. In one embodiment, the bright field illumination system of the barcode reader 1900 may emit bright field illumination 112 substantially parallel to the optical paths 1906*a-b*. In another embodiment, illumination from the illumination sources may enter the refracting diffusors 1910*a-b* at an entry angle that is substantially parallel to the second optical path 1906*b*. The bright field illumination 112 may exit the refracting diffusors 1910*a-b* toward the field of view at a converging angle (e.g., 30 degrees or less).

As shown in FIG. 20, the dark field illumination system of the barcode reader 1900 is positioned outside of the field of view. More specifically, FIG. 20 shows component 1913*b*, which is positioned behind illumination sources 1952*b* (as shown in FIG. 19). The diffuse bright field illumination system and the bright field illumination system are positioned between the lens assemblies 1904*a-b* and a point from which the dark field illumination system projects the dark field illumination 156 into the field of view. The diffuse bright field illumination system and the bright field illumination system are outside of the field of view.

The dark field illumination system projects the dark field illumination 156 into the field of view at a first angle from the first optical path 1906*a*. This first angle may be less than 45 degrees from a plane that is perpendicular to the first optical path 1906*a*. The diffuse bright field illumination system projects diffuse bright field illumination 124 and the bright field illumination system projects bright field illumination 112 into the field of view at a second angle from the second optical path 1906*b*. The second angle may be different than the first angle. For example, the second angle may be substantially parallel to the second optical path 1906*b*.

In an alternative embodiment, the dark field illumination system of the barcode reader 1900 may be configured similarly to any of the other dark field illumination systems described previously. For example, in place of the optics 1954*a-b*, the dark field illumination system of the barcode reader 1900 may include refracting diffusors that take the form of light pipes 788*a-b* having chamfered ends 778*a-b* (as shown in FIG. 5). Illumination sources 1952*a-b* may project illumination 776*a-b* into the light pipes 788*a-b* at an angle (which may be referred to herein as an entry angle) that is substantially parallel to the first optical path 1906*a*. The chamfered ends 778*a-b* may re-direct the illumination 776*a-b* so that the dark field illumination 156 exits the light pipes 788*a-b* and is emitted toward the first optical path 1906*a* at an emission angle that is different than the entry angle. The emission angle may be less than 45 degrees from a plane that is perpendicular to the first optical path 1906*a*.

In another embodiment, the dark field illumination system of the barcode reader 1900 may include an optical substrate 811 (as shown in FIG. 8A). Illumination sources 813*a-b* may project illumination 815*a-b* into the optical substrate 811 from the side, and this illumination 815*a-b* may be internally reflected within the substrate 811 and emitted as the dark field illumination 156. In this embodiment, the entry angle (i.e., the angle at which the illumination sources 813*a-b* project illumination 815*a-b* into the optical substrate 811) is substantially perpendicular to the emission angle (i.e., the angle at which the dark field illumination 156 is emitted toward the first optical path 1906*a*).

The optical substrate 1922 includes a front major surface 1940 and a back major surface 1938, which may be similar to the front major surface 140 and the back major surface 138 of the optical substrate 122. The front major surface 1940 and the back major surface 1938 are both substantially perpendicular to the optical paths 1906*a*, 1906*b*. The front major surface 1940 faces the field of view. The illumination sources 1920*a-d* propagate illumination between the front major surface 140 and the back major surface 138.

The optical substrate 1922 may include extraction features that are similar to any of the extraction features 142 described above in connection with the optical substrate 122. These extraction features 142 cause the diffuse bright field illumination 156 to exit the front major surface 1940 into the field of view.

As used herein, the phrase "substantially parallel" means within five degrees of parallel. In another embodiment, substantially parallel means within 15 degrees of parallel. In another embodiment, substantially parallel means within 20 degrees of parallel.

As used herein, the phrase "substantially perpendicular" means within five degrees of perpendicular. In another embodiment, substantially perpendicular means within 15 degrees of perpendicular. In another embodiment, substantially perpendicular means within 20 degrees of perpendicular.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

As used herein, the phrase "based on" does not mean "based only on," unless expressly specified otherwise. In other words, the phrase "based on" describes both "based only on" and "based at least on."

One or more of the features, functions, procedures, operations, components, elements, structures, etc., described in connection with any one of the configurations described herein may be combined with one or more of the functions, procedures, operations, components, elements, structures, etc., described in connection with any of the other configurations described herein, where compatible.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The claims are not limited to the specific implementations described above. Various modifications, changes and variations may be made in the arrangement, operation and details of the implementations described herein without departing from the scope of the claims.

What is claimed is:

1. A barcode reader, comprising:
a first lens assembly with a first field of view and a first optical path for first illumination from the first field of view to project to a first image sensor section;
a second lens assembly with a second field of view and a second optical path for second illumination from the second field of view to project to a second image sensor section;
a first illumination system positioned outside of the first field of view projecting the first illumination into the first field of view at a first angle from the first optical path; and
a second illumination system positioned between the second lens assembly and a point from which the first illumination system projects the first illumination into the first field of view, the second illumination system being outside of the second field of view and projecting the second illumination into the second field of view at a second angle from the second optical path, the second angle being different than the first angle; wherein the first optical path and the second optical path are substantially parallel.

2. The barcode reader of claim 1, wherein the first angle is less than 45 degrees from a plane that is perpendicular to the first optical path.

3. The barcode reader of claim 1, wherein the second angle is substantially parallel to the second optical path.

4. A barcode reader, comprising:
a first lens assembly with a first field of view and a first optical path for first illumination from the first field of view to project to a first image sensor section;
a second lens assembly with a second field of view and a second optical path for second illumination from the second field of view to project to a second image sensor section;
a first illumination system positioned outside of the first field of view projecting the first illumination into the first field of view at a first angle from the first optical path; and
a second illumination system positioned between the second lens assembly and a point from which the first illumination system projects the first illumination into the first field of view, the second illumination system being outside of the second field of view and projecting the second illumination into the second field of view at a second angle from the second optical path, the second angle being different than the first angle, wherein the first illumination system comprises a first set of illumination sources that are positioned to a left side of the first and second lens assemblies and a second set of illumination sources that are positioned to a right side of the first and second lens assemblies.

5. The barcode reader of claim 4, further comprising control circuitry that independently controls intensity of the first set of illumination sources and the second set of illumination sources.

6. The barcode reader of claim 4, wherein the first illumination system comprises a back lit illumination diffusor projecting the first illumination into the first field of view at the first angle, the first angle being less than 45 degrees from a plane that is perpendicular to the first optical path.

7. The barcode reader of claim 4, wherein the first illumination system comprises a refracting diffusor through which illumination enters at an entry angle that is different than the first angle and exits towards the first field of view at the first angle, the first angle being less than 45 degrees from a plane that is perpendicular to the first optical path.

8. The barcode reader of claim 7, wherein the entry angle is substantially parallel to the first optical path.

9. The barcode reader of claim 7, wherein the entry angle is substantially perpendicular to the first angle.

10. A barcode reader, comprising:
a first lens assembly with a first field of view and a first optical path for first illumination from the first field of view to project to a first image sensor section;
a second lens assembly with a second field of view and a second optical path for second illumination from the second field of view to project to a second image sensor section;
a first illumination system positioned outside of the first field of view projecting the first illumination into the first field of view at a first angle from the first optical path; and
a second illumination system positioned between the second lens assembly and a point from which the first illumination system projects the first illumination into the first field of view, the second illumination system being outside of the second field of view and projecting the second illumination into the second field of view at a second angle from the second optical path, the second angle being different than the first angle;
wherein the second illumination system is a diffuse bright field illumination system comprising:
an optical substrate with a front major surface and a back major surface, each of which is substantially perpendicular to the first and second optical paths, the front major surface facing the first and second fields of view;
at least one illumination source propagating illumination between the front major surface and the back major surface; and
extraction features causing the second illumination to exit the front major surface into the second field of view.

11. A barcode reader, comprising:
a first lens assembly with a first field of view and a first optical path for first illumination from the first field of view to project to a first image sensor section;
a second lens assembly with a second field of view and a second optical path for second illumination from the second field of view to project to a second image sensor section;
a first illumination system positioned outside of the first field of view projecting the first illumination into the first field of view at a first angle from the first optical path; and
a second illumination system positioned between the second lens assembly and a point from which the first illumination system projects the first illumination into the first field of view, the second illumination system being outside of the second field of view and projecting the second illumination into the second field of view at a second angle from the second optical path, the second angle being different than the first angle; wherein the second illumination system is a direct bright field illumination system comprising two refracting diffusors, through each of which illumination enters at an entry angle that is substantially parallel to the second optical path and exits towards the second field of view at a converging angle.

12. A barcode reader, comprising:

an image sensor configured to capture an image of a barcode within a field of view of the barcode reader;

a first set of imaging optics and a second set of imaging optics, each providing a corresponding image of the barcode on the image sensor;

the first set of imaging optics comprising a first lens assembly with a first optical path from the field of view through the first lens assembly to a first portion of the image sensor;

the second set of imaging optics comprising a second lens assembly with a second optical path from the field of view through the second lens assembly to a second portion of the image sensor;

a first illumination system positioned outside of the field of view projecting first illumination into the field of view at a first angle from the first optical path; and a second illumination system positioned between the second lens assembly and a point from which the first illumination system projects the first illumination into the field of view, the second illumination system being outside of the field of view and projecting second illumination into the field of view at a second angle from the second optical path, the second angle being different than the first angle.

13. The barcode reader of claim 12, wherein the first optical path and the second optical path are substantially parallel.

14. The barcode reader of claim 13, wherein the first angle is less than 45 degrees from a plane that is perpendicular to the first optical path.

15. The barcode reader of claim 13, wherein the second angle is substantially parallel to the second optical path.

16. The barcode reader of claim 12, wherein the first illumination system comprises a first set of illumination sources that are positioned to a left side of the field of view and a second set of illumination sources that are positioned to a right side of the field of view.

17. The barcode reader of claim 16, further comprising control circuitry that independently controls intensity of the first set of illumination sources and the second set of illumination sources.

18. The barcode reader of claim 16, wherein the first illumination system comprises a back lit illumination diffusor projecting illumination into the field of view at the first angle, the first angle being less than 45 degrees from a plane that is perpendicular to the first optical path.

19. The barcode reader of claim 16, wherein the first illumination system comprises a refracting diffusor through which illumination enters at an entry angle that is different than the first angle and exits towards the field of view at the first angle, the first angle being less than 45 degrees from a plane that is perpendicular to the first optical path.

20. The barcode reader of claim 19, wherein the entry angle is substantially parallel to the first optical path.

21. The barcode reader of claim 19, wherein the entry angle is substantially perpendicular to the first angle.

22. The barcode reader of claim 12, wherein the second illumination system is a diffuse bright field illumination system comprising:

an optical substrate with a front major surface and a back major surface, each of which is substantially perpendicular to an optical path of the barcode reader, the front major surface facing the field of view;

at least one illumination source propagating illumination between the front major surface and the back major surface; and extraction features causing the second illumination to exit the front major surface into the field of view.

23. The barcode reader of claim 12, wherein the second illumination system is a direct bright field illumination system comprising two refracting diffusors, through each of which illumination enters at an entry angle substantially parallel to the second optical path and exits towards the field of view at a converging angle.

24. A barcode reader, comprising:

an image sensor configured to capture an image of a barcode within a field of view of the barcode reader;

a first illumination system positioned outside of the field of view projecting first illumination into the field of view at a first angle from a first optical path;

a second illumination system positioned between a second lens assembly and a point from which the first illumination system projects the first illumination into the field of view, the second illumination system being outside of the field of view and projecting second illumination into the field of view at a second angle from a second optical path, the second angle being different than the first angle; and a first set of imaging optics and a second set of imaging optics, each providing a corresponding image of the barcode on the image sensor;

wherein the first set of imaging optics is configured to focus an image of the barcode, when illuminated by the first illumination system, with a superior contrast profile than when illuminated by the second illumination system;

wherein the second set of imaging optics is configured to focus an image of the barcode, when illuminated by the second illumination system, with a superior contrast profile than when illuminated by the first illumination system; and wherein superior contrast profile means at least one of: (i) greater maximum amplitude between the portions of the image that are dark marks of the barcode and the portions of the image that are light marks of the barcode; and (ii) more distinct transitions between portions of the image that are dark marks of the barcode and the portions of the image that are light marks of the barcode.

25. The barcode reader of claim 24, wherein the first illumination system is a dark field illumination system, the dark field illumination system emitting the illumination of a first illumination spectrum into the field of view at an emission angle that is less than 45 degrees from a plane that is perpendicular to an optical path from the image sensor through the first set of imaging optics into a center of the field of view of the first set of imaging optics.

26. The barcode reader of claim 25, wherein the dark field illumination system comprises a first set of illumination sources positioned to a right side of a first lens assembly and the second lens assembly and a second set of illumination sources positioned to a left side of the first and second lens assemblies.

27. The barcode reader of claim 26, further comprising control circuitry that independently controls intensity of the first set of illumination sources and the second set of illumination sources.

28. The barcode reader of claim 25, wherein the dark field illumination system comprises a back lit illumination diffusor emitting the first illumination towards the first optical path at the emission angle.

29. The barcode reader of claim 25, wherein:

the dark field illumination system comprises a refracting diffusor through which the first illumination is emitted towards the first optical path at the emission angle; and illumination enters the refracting diffusor at an entry angle that is different than the emission angle.

30. The barcode reader of claim 29, wherein the entry angle is substantially parallel to the first optical path.

31. The barcode reader of claim 29, wherein the entry angle is substantially perpendicular to the emission angle.

32. The barcode reader of claim 24, wherein the second illumination system is a diffuse bright field illumination system comprising:
- an optical substrate with a front major surface and a back major surface, each of which is substantially perpendicular to an optical path of the barcode reader, the front major surface facing a field of view of a first lens assembly and the second lens assembly;
- at least one illumination source propagating illumination between the front major surface and the back major surface; and
- extraction features causing the second illumination to exit the front major surface into the fields of view of the first and second lens assemblies.

* * * * *